United States Patent
Hasegawa

(10) Patent No.: US 12,164,863 B2
(45) Date of Patent: Dec. 10, 2024

(54) IMAGE PROCESSING APPARATUS, IMAGE PROCESSING SYSTEM, AND STORAGE MEDIUM

(71) Applicant: CANON KABUSHIKI KAISHA, Tokyo (JP)

(72) Inventor: Kiichi Hasegawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 18/340,711

(22) Filed: Jun. 23, 2023

(65) Prior Publication Data

US 2023/0419025 A1    Dec. 28, 2023

(30) Foreign Application Priority Data

Jun. 27, 2022  (JP) ................................ 2022-102376

(51) Int. Cl.
| | |
|---|---|
| G06F 3/048 | (2013.01) |
| G06F 40/106 | (2020.01) |
| G06F 40/18 | (2020.01) |
| G06V 30/14 | (2022.01) |

(52) U.S. Cl.
CPC ............ G06F 40/18 (2020.01); G06F 40/106 (2020.01); G06V 30/1444 (2022.01)

(58) Field of Classification Search
CPC .... G06F 40/18; G06F 40/106; G06V 30/1444
See application file for complete search history.

(56) References Cited

U.S. PATENT DOCUMENTS

| | | | | |
|---|---|---|---|---|
| 10,708,358 | B1* | 7/2020 | Diasti | G06F 40/106 |
| 2005/0141044 | A1* | 6/2005 | Morita | H04N 1/32358 |
| | | | | 358/448 |
| 2006/0062453 | A1* | 3/2006 | Schacht | G06V 30/1444 |
| | | | | 382/164 |
| 2007/0046979 | A1* | 3/2007 | Minowa | H04N 1/00278 |
| | | | | 358/1.15 |
| 2009/0208144 | A1* | 8/2009 | Lin | H04N 1/00968 |
| | | | | 382/321 |
| 2009/0237696 | A1* | 9/2009 | Hinaga | H04N 1/32112 |
| | | | | 358/448 |
| 2012/0039536 | A1* | 2/2012 | Dejean | G06V 30/12 |
| | | | | 382/176 |

(Continued)

FOREIGN PATENT DOCUMENTS

JP         2012093847 A       5/2012

OTHER PUBLICATIONS

Kaundilya et al., Automated Text Extraction from Images using OCR System, 2019, IEEE, 6 pages.*

(Continued)

*Primary Examiner* — Linh K Pham
(74) *Attorney, Agent, or Firm* — Canon U.S.A., Inc. IP Division

(57) ABSTRACT

An image processing apparatus includes a reading unit configured to generate image data by reading an original, a reception unit configured to receive selection of a stored file from a user, an acquisition unit configured to acquire character information from the image data generated by the reading unit, and an execution unit configured to perform processing for inserting the character information acquired by the acquisition unit into the selected file.

12 Claims, 18 Drawing Sheets

(56) References Cited

U.S. PATENT DOCUMENTS

| | | | | |
|---|---|---|---|---|
| 2012/0163718 A1* | 6/2012 | Reddy | ............... | G06V 30/1444 |
| | | | | 382/176 |
| 2013/0185340 A1* | 7/2013 | Lee | ................... | H04N 1/00236 |
| | | | | 707/821 |
| 2016/0132495 A1* | 5/2016 | Ghatage | .................. | G06F 40/12 |
| | | | | 707/756 |
| 2018/0097964 A1* | 4/2018 | Yamada | ............. | H04N 1/00331 |
| 2018/0341371 A1* | 11/2018 | Callaghan | ............. | G06F 40/177 |
| 2019/0228220 A1* | 7/2019 | Matsumoto | ........... | G06V 30/418 |
| 2021/0200938 A1* | 7/2021 | Deleverio | ............. | G06F 3/1205 |
| 2021/0256253 A1* | 8/2021 | Chen | .................... | G06F 40/106 |
| 2022/0292251 A1* | 9/2022 | Shiraishi | ............... | G06F 40/117 |
| 2022/0309816 A1* | 9/2022 | Furton | ............... | H04N 1/32475 |
| 2022/0350956 A1* | 11/2022 | Kawashima | ....... | G06V 30/1444 |

OTHER PUBLICATIONS

Petcu et al., Optical Character Recognition on a Grid Infrastructure, 2007, IEEE, 4 pages.*

Mantoro et al., Optical Character Recognition (OCR) Performance in Server-based Mobile Environment, 2013, IEEE, 6 pages.*

Kaló et al, Key-Value Pair Searhing System via Tesseract OCR and Post Processing, 2021, IEEE, 4 Pages.*

* cited by examiner

FIG.9
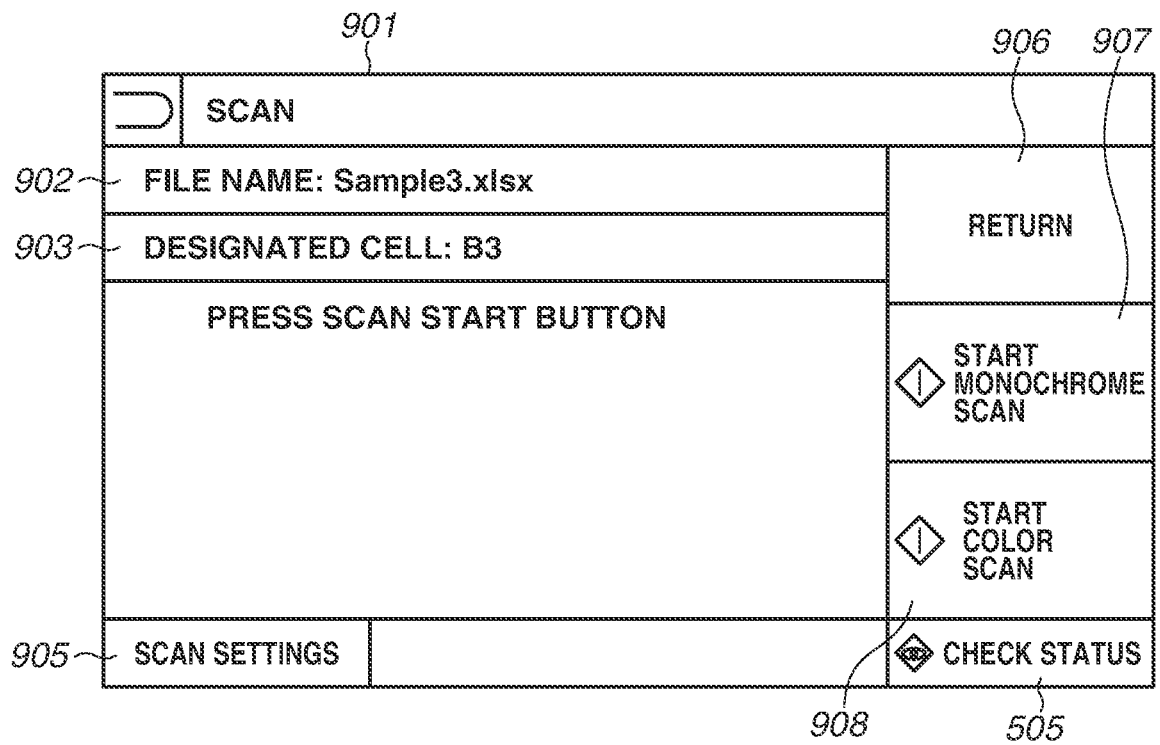
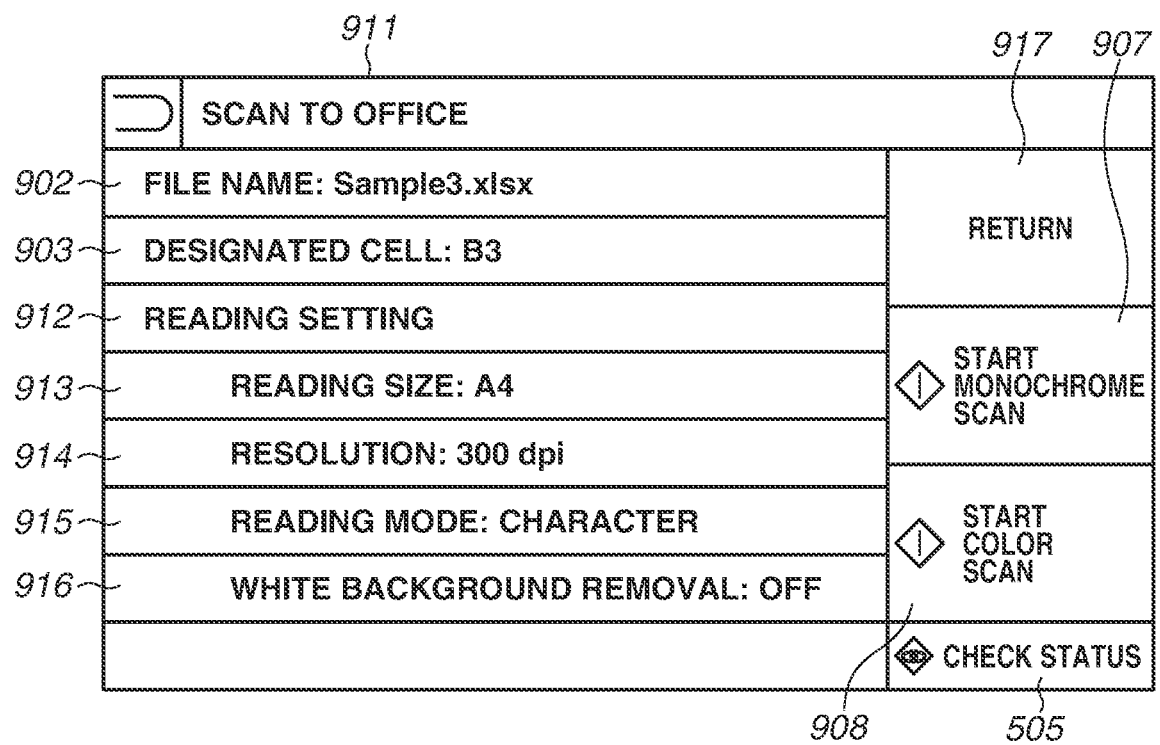

IMAGE PROCESSING APPARATUS, IMAGE PROCESSING SYSTEM, AND STORAGE MEDIUM

BACKGROUND

Field of the Disclosure

The present disclosure relates to an image processing apparatus, an image processing system, and a storage medium.

Description of the Related Art

Japanese Patent Application Laid-Open No. 2012-93847 discusses a technique of attaching image data generated by an image processing apparatus scanning an image on an original, to a newly-created file for a spreadsheet application, such as Microsoft® Excel.

To add information described in an original to a file including entered data, the technique discussed in Japanese Patent Application Laid-Open No. 2012-93847 may resist combining the information with the entered data because the information is generated as image data.

In addition, the technique discussed in Japanese Patent Application Laid-Open No. 2012-93847 generates a new file every scanning an original, which entails a user inserting information on his/her own to combine the information with an already-existing file.

SUMMARY

In view of the above, embodiments of the present disclosure are directed to saving a user trouble in adding character information included in image data generated by an image processing apparatus reading an image on an original, to an existing file.

According to embodiments of the present disclosure, an image processing apparatus includes a reading unit configured to generate image data by reading an original, a reception unit configured to receive selection of a stored file from a user, an acquisition unit configured to acquire character information from the image data generated by the reading unit, and an execution unit configured to perform processing for inserting the character information acquired by the acquisition unit into the selected file.

Further features of the present disclosure will become apparent from the following description of exemplary embodiments with reference to the attached drawings.

BRIEF DESCRIPTION OF THE DRAWINGS

FIG. 9 illustrates an example of a scan screen and a scan setting screen.

DESCRIPTION OF THE EMBODIMENTS

Figure 1:
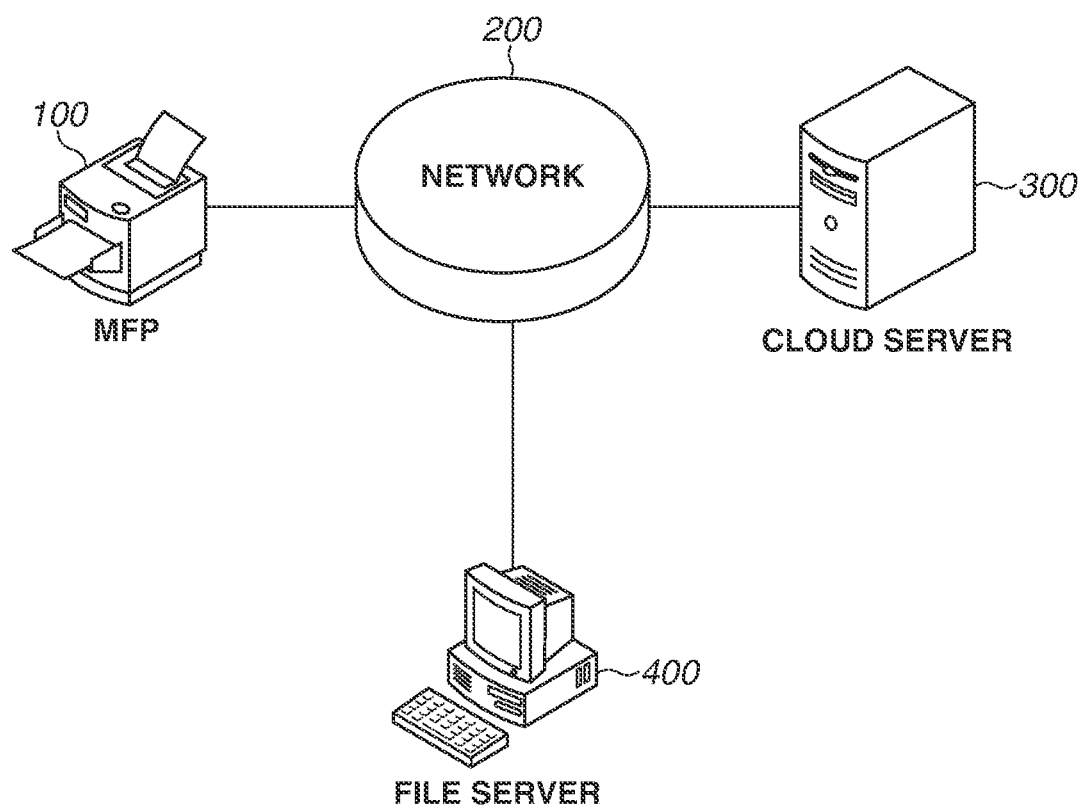
FIG. 1 illustrates an example of a system configuration according to a first exemplary embodiment of the present disclosure.

Hereinafter, forms for implementing embodiments of the present disclosure will be described with reference to the drawings. The configurations to be described in the following exemplary embodiments are examples, and the present disclosure is not limited to the configurations illustrated in the drawings.

A first exemplary embodiment will be described. FIG. 1 illustrates an example of a system configuration according to the present exemplary embodiment of the present disclosure.

An image processing system according to the present exemplary embodiment, an example of a cloud storage service, includes a multifunction peripheral (MFP) 100, an image processing apparatus that can communicate with a cloud server 300 via a network 200, and that also functions as a scan apparatus. A file server 400 can communicate with the MFP 100 connected via the network 200 with the file server 400. The cloud server 300 is a cloud server that stores image files uploaded from the MFP 100, and performs image file display and edit management in response to access made by a user operation from a mobile terminal (not illustrated) or a personal computer (PC) (not illustrated). The file server 400 receives image files transmitted from the MFP 100, and performs image file display and edit management in response to access made by a user operation from a mobile terminal (not illustrated) or a PC (not illustrated). The network 200 according to the present exemplary embodiment may be the Internet or a local area network (LAN). In addition, the network 200 may be a wired network or a wireless network.

Figure 2:
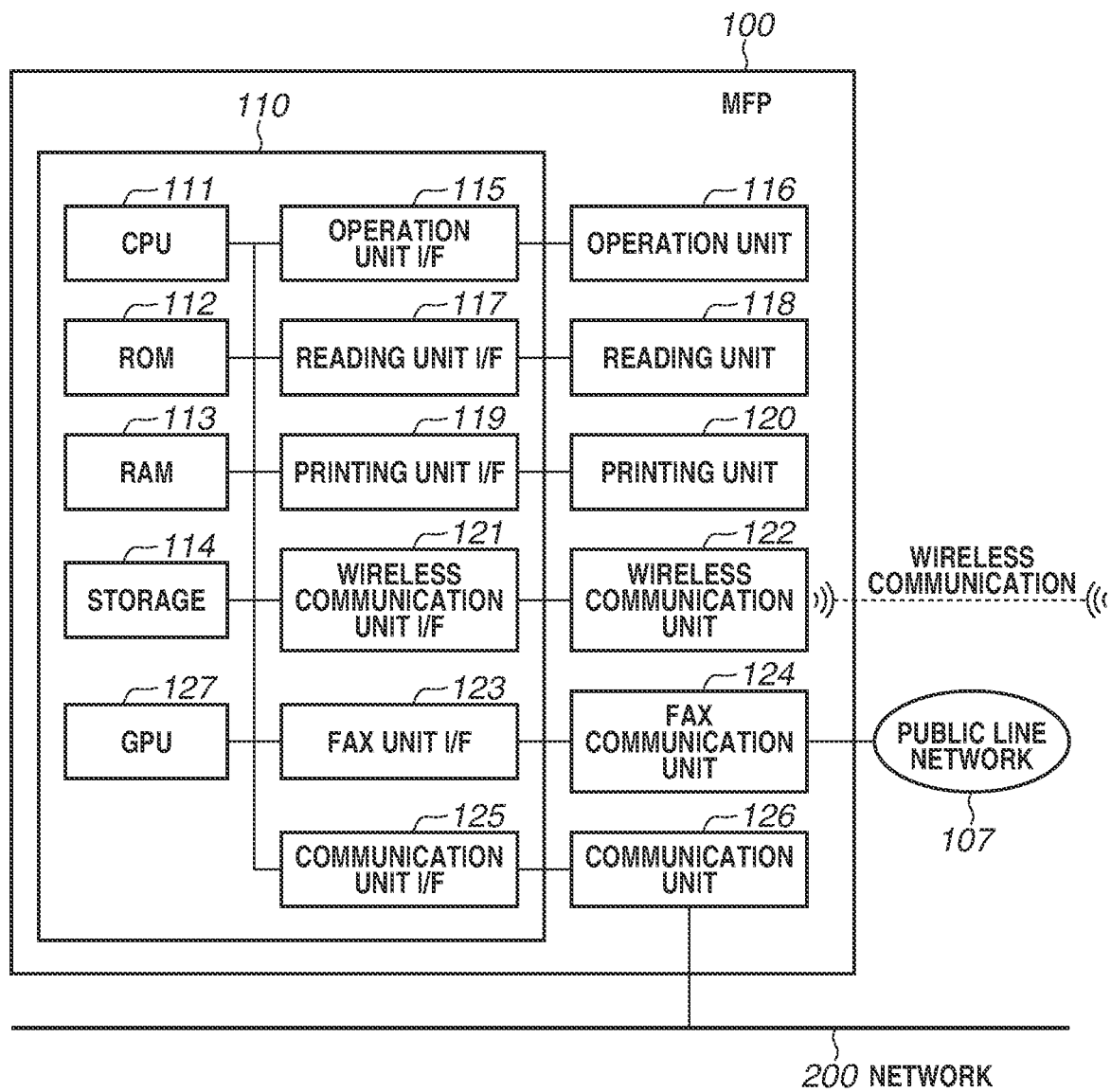
FIG. 2 illustrates an example of a hardware configuration of a multifunction peripheral (MFP).

FIG. 2 illustrates an example of a hardware configuration of the MFP 100. The MFP 100 includes a central processing unit (CPU) 111, a read-only memory (ROM) 112, a random access memory (RAM) 113, a storage 114, an operation unit interface (I/F) 115, an operation unit 116, a reading unit OF 117, a reading unit 118, a printing unit OF 119, a printing unit 120, a wireless communication unit OF 121, and a wireless communication unit 122. The MFP 100 further includes a FAX unit OF 123, a FAX communication unit 124, a communication unit OF 125, and a communication unit 126. A control unit 110 including the CPU 111 controls the overall operations of the MFP 100. The CPU 111 performs various types of control, such as reading control and printing control, by loading control programs stored in the ROM 112 or the storage 114, onto the RAM 113. The ROM 112 stores control programs that can be run by the CPU 111. The ROM 112 also stores boot programs and font data. The RAM 113 is a main storage memory, and is used as a work area or a temporary storage region for loading various control programs stored in the ROM 112 and the storage 114. The storage 114 stores image data, print data, various types of programs, and various types of setting information. In the present exemplary embodiment, a flash memory is assumed to be used as the storage 114. An auxiliary storage device, such as a solid state drive (SSD) or a hard disc drive (HDD), may be used. An embedded multimedia card (eMMC) may be used. In the MFP 100 according to the present exemplary embodiment, one CPU 111 performs each piece of processing illustrated in a flowchart to be described below, using one memory (the RAM 113), but a configuration is not limited to this. For example, each piece of processing illustrated in a flowchart to be described below can also be performed by cooperation between a plurality of CPUs, RAMs, ROMs, and storages. In addition, partial processing may be performed using a hardware circuit, such as an application specific integrated circuit (ASIC) or a field programmable gate array (FPGA). The operation unit I/F 115 connects the operation unit 116 including a display unit, such as a touch panel, and hardware keys, and the control unit 110 to each other. The operation unit 116 displays information to the user, and detects an entry made by the user. The reading unit OF 117 connects the reading unit 118, such as a scanner, and the control unit 110 to each other. The reading unit 118 reads an image on an original, and the CPU 111 converts the read image into image data, such as binary data. The image data generated based on the image read by the reading unit 118 is transmitted to an external apparatus, or printed onto recording paper. The reading unit 118 includes an automatic document feeder (ADF) that can read images on originals conveyed from a document tray in the MFP 100 and generate image data. The printing unit OF 119 connects the printing unit 120, such as a printer, and the control unit 110 to each other. The CPU 111 transfers image data (print data) stored in the RAM 113 via the printing unit OF 119 to the printing unit 120. The printing unit 120 prints an image that is based on the transferred image data, onto recording paper fed from a sheet feeding cassette. The wireless communication unit OF 121 is an OF for controlling the wireless communication unit 122, and connects the control unit 110 and an external wireless device to each other via wireless connection. The control unit 110 is connected to a public line network 107 by controlling the FAX communication unit 124, such as a facsimile, via the FAX unit OF 123. The FAX unit OF 123 is an OF for controlling the FAX communication unit 124, the OF allowing connection to a public line network and control of a facsimile communication protocol by controlling a modem for facsimile communication or a network control unit (NCU). The communication unit OF 125 connects the control unit 110 and the network 200 to each other. The communication unit 126 transmits image data and various types of information in the apparatus via the communication unit OF 125 to an external apparatus on the network 200, and receives print data from an information processing apparatus on the network 200, and information on the network 200. Examples of methods of transmission and reception performed via the network 200 include transmission and reception performed using an e-mail, and file transmission performed using another protocol (e.g., file transfer protocol (FTP), server message block (SMB), web-based distributed authoring and versioning (WEBDAV), etc.).

Figure 3:
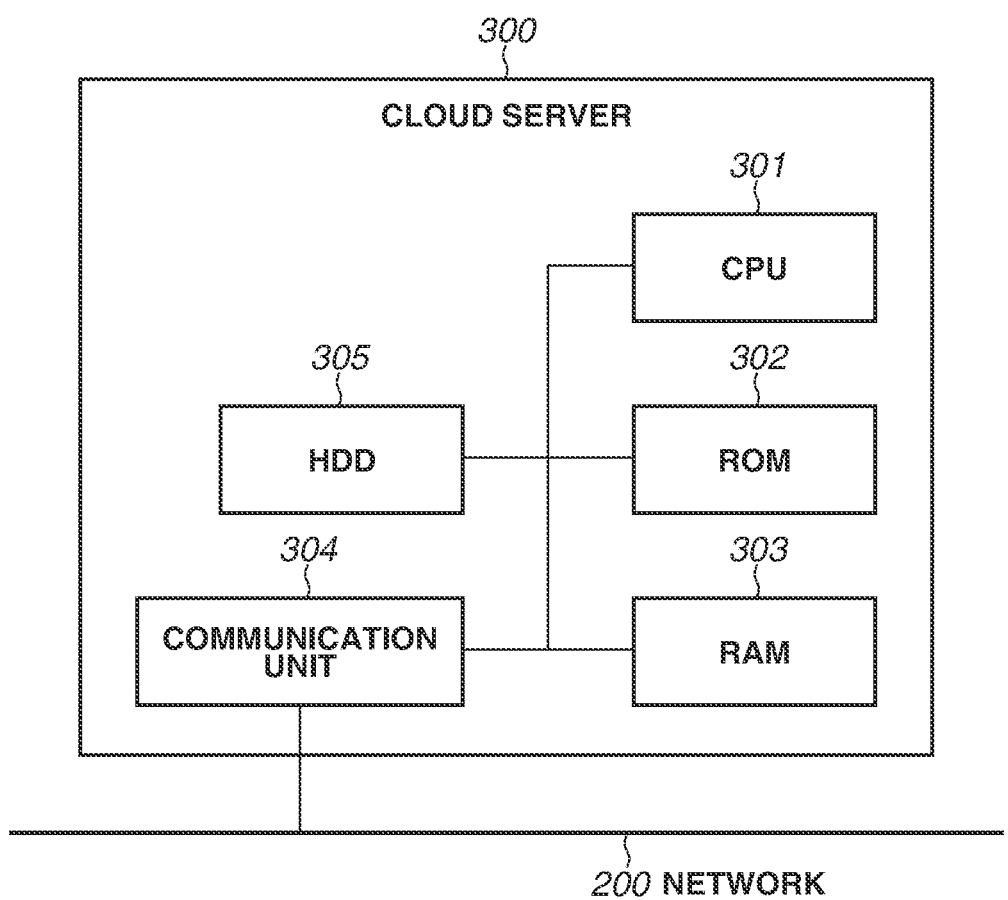
FIG. 3 illustrates an example of a hardware configuration of a cloud server.

FIG. 3 illustrates an example of a hardware configuration of the cloud server 300. A CPU 301 performs various types of processing for controlling the operations of the cloud server 300, by reading out control programs stored in a ROM 302. The ROM 302 stores control programs. A RAM 303 is used as a main memory of the CPU 301, and a temporary storage region, such as a work area. An HDD 305 stores various types of data, such as image data. The cloud server 300 can transmit and receive data to and from various devices, such as the MFP 100, via a communication unit 304. The communication unit 304 may perform wired communication using Ethernet®, or may perform wireless communication, such as Wi-Fi communication.

Figure 4:
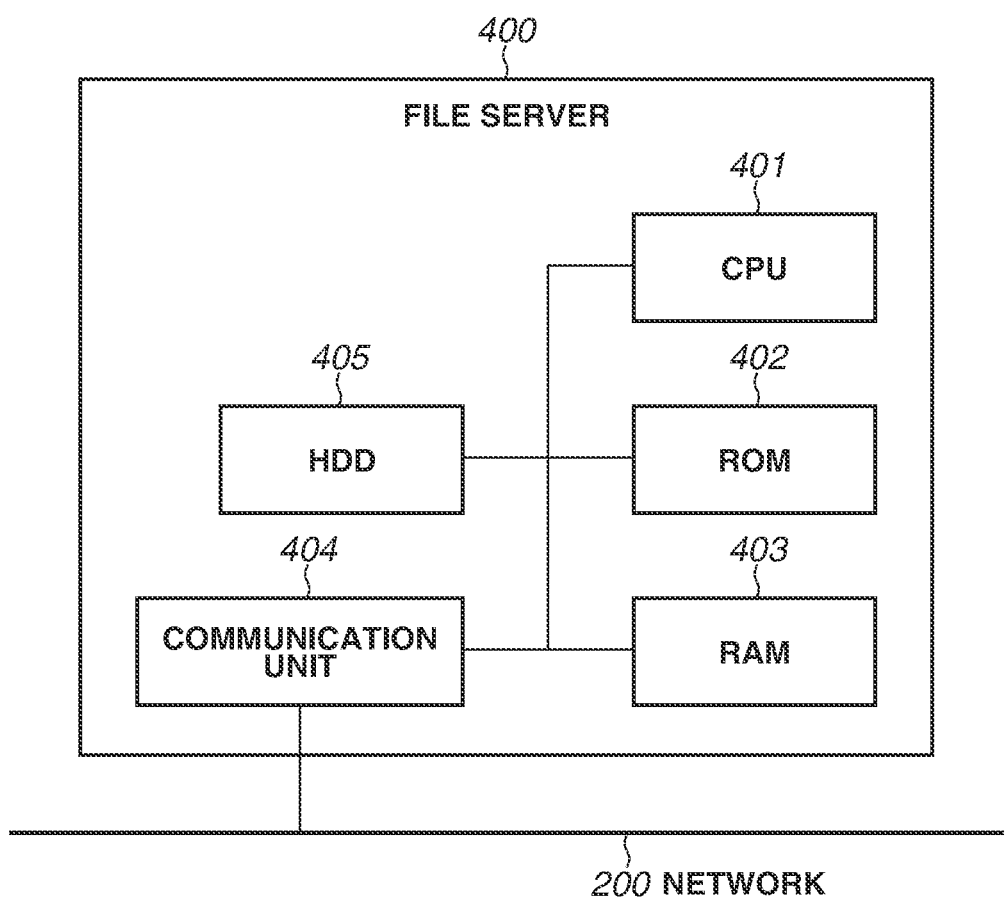
FIG. 4 illustrates an example of a hardware configuration of a file server.

FIG. 4 illustrates an example of a hardware configuration of the file server 400. A CPU 401 performs various types of processing for controlling the operations of the file server 400, by reading out control programs stored in a ROM 402. The ROM 402 stores control programs.

A RAM 403 is used as a main memory of the CPU 401, and a temporary storage region, such as a work area. An HDD 405 stores various types of data, such as image data. The file server 400 can transmit and receive data to and from various devices, such as the MFP 100, via a communication unit 404.

Figure 5:
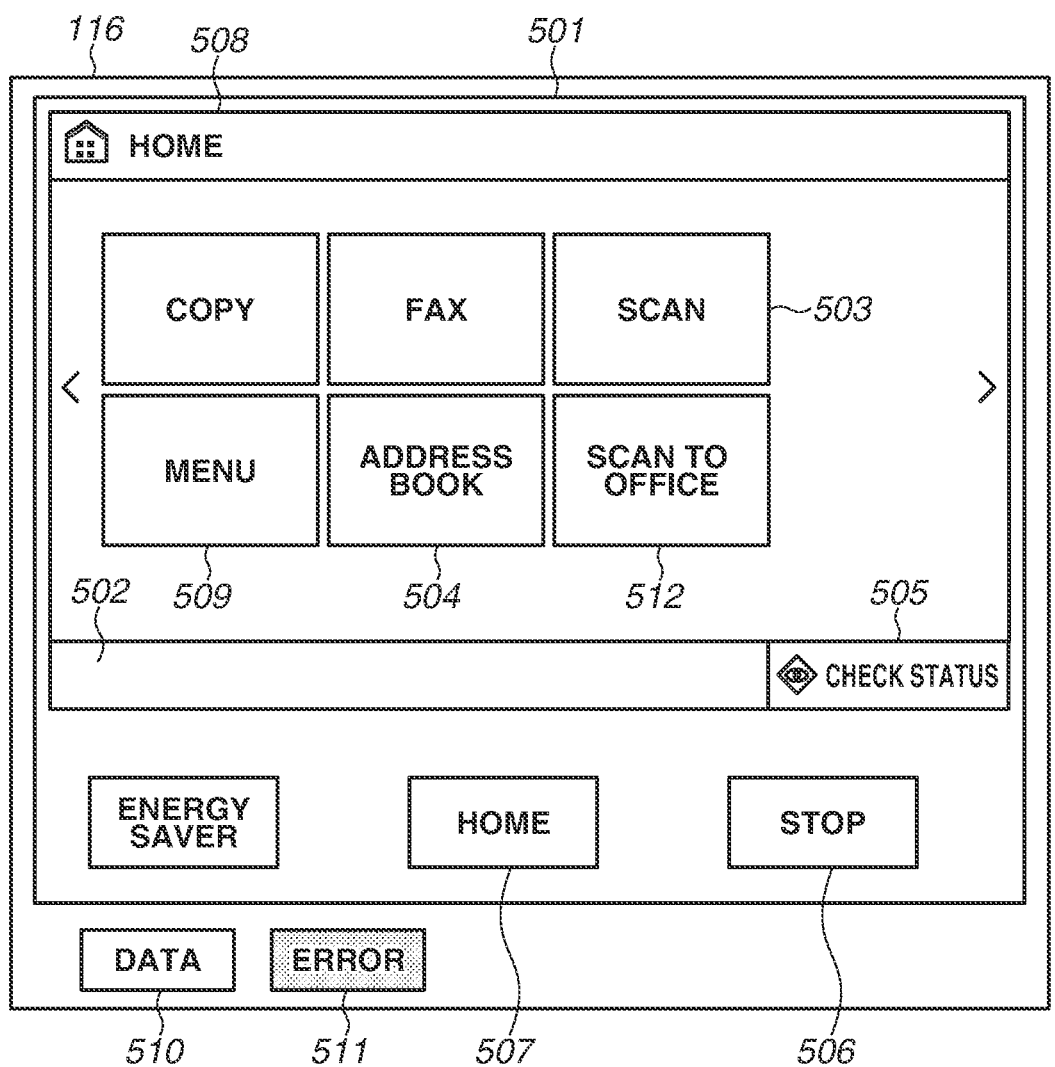
FIG. 5 illustrates an example of a home screen to be displayed on an operation unit of the MFP.

FIG. 5 illustrates an example of a home screen to be displayed on the operation unit 116 of the MFP 100.

The operation unit 116 includes a touch panel 501 for displaying an operation screen, and light-emitting diodes (LEDs) 510 and 511. The touch panel 501 also function as a reception unit that receives instructions from the user, and also function as a display unit that displays screens. The user issues instructions of carrying out the functions that are based on a screen displayed on the touch panel 501, by directly touching the displayed screen using a finger or an object, such as a stylus.

The touch panel 501 illustrated in FIG. 5 displays a home screen 508. The home screen 508 is an initial screen for issuing instructions of carrying out functions of the MFP 100, and is a screen for selecting a screen to be displayed for making various settings for the functions to be carried out by the MFP 100, such as copy, facsimile, and scan. A status check button 505 is an object for displaying a screen (status check screen) for checking the status of the MFP 100. A transmission history and a job history can be displayed on the status check screen (not illustrated).

A scan button 503 is an object for displaying a scan selection screen (not illustrated). The scan selection screen is a screen for selecting a transmission function, such as an e-mail transmission (E-mail), file transmission that uses the SMB, the FTP, or a HyperText Transfer Protocol (HTTP), or Internet FAX (I-FAX) transmission. By touching a displayed object indicating a transmission function, a setting screen for the transmission function is displayed.

An address book button 504 is an object for displaying an address book screen of the MFP 100. The LEDs 510 and 511 notify the user of the status of the MFP 100. The LED 510 lights up while an e-mail or a print job is being received, or while a print job is being performed, and the LED 511 lights up when some sort of error occurs in the MFP 100. A stop button 506 is an object for cancelling various operations, and is an object constantly displayed on the operation unit 116. A home button 507 is an object for displaying the home screen 508, and is an object constantly displayed on the operation unit 116. A menu button 509 is an object for displaying a screen for making environmental settings, such as a used language, and settings for the functions.

A button 512 is an object for displaying a folder selection screen for character insertion processing, which is a method of proposal. If the button 512 is selected by the user, a folder selection screen 601 illustrated in FIG. 6 is displayed on the operation unit 116, and the character insertion processing is started.

Figure 6:
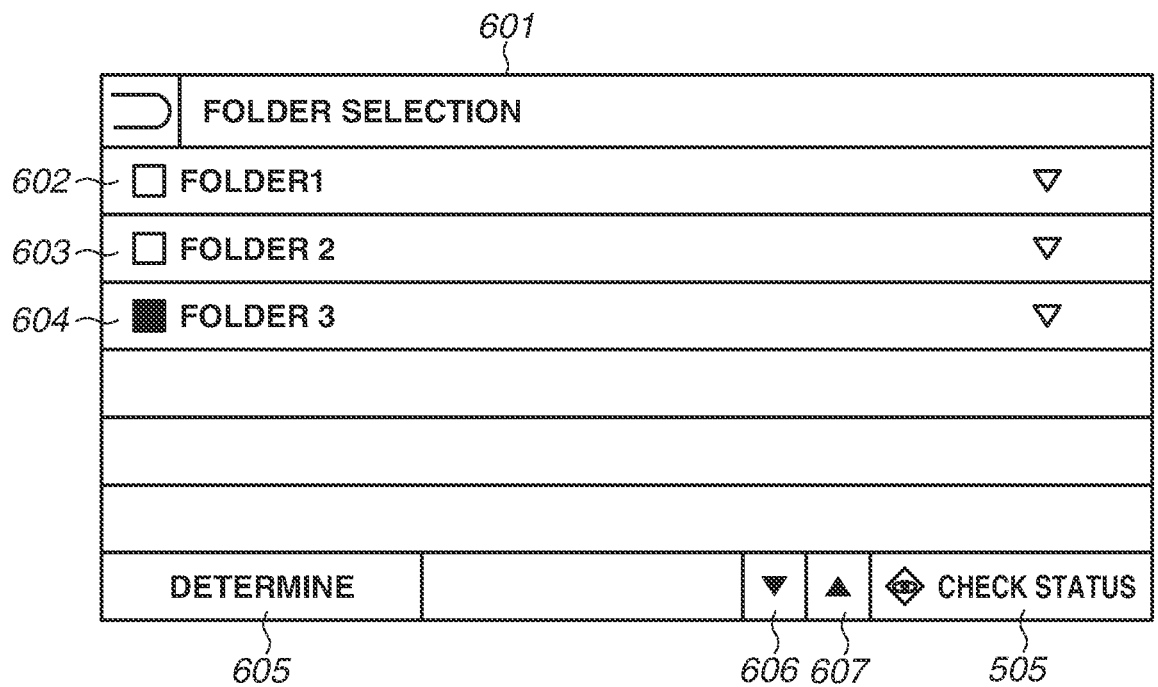
FIG. 6 illustrates an example of a folder selection screen.

FIG. 6 illustrates an example of the folder selection screen 601. The folder selection screen 601 is a selection screen of a folder usable by the MFP 100, which is displayed on the operation unit 116 after the user presses the button 512.

A FOLDER 1 button 602, a FOLDER 2 button 603, and a FOLDER 3 button 604 are displayed on the folder selection screen 601. A folder to be selected is designated by pressing one of the buttons 602 to 604 or pressing a selection button 606 or 607, and a target folder is determined by pressing a determination button 605. FIG. 6 illustrates an example in which a FOLDER 3 is selected.

A list of folders to be displayed on the folder selection screen 601 illustrated in FIG. 6 is created based on folder configuration information acquired from the cloud server 300 when the button 512 is pressed. The location of the folder configuration information in the cloud server 300 to be referred to at this time is pre-registered by the user using a uniform resource locator (URL) or a path. For folder configuration information in another server, the folder configuration information can be registered in association with another button. This configuration eliminates the need to change information on a server or a folder every changing a list of folders to be selected.

As a list of folders to be displayed on the folder selection screen 601, a list of folders stored in the storage 114 of the MFP 100 may be displayed. Folders stored in the storage 114, folders stored in the file server 400, and folders in the cloud server 300 may be displayed together.

Figure 7:
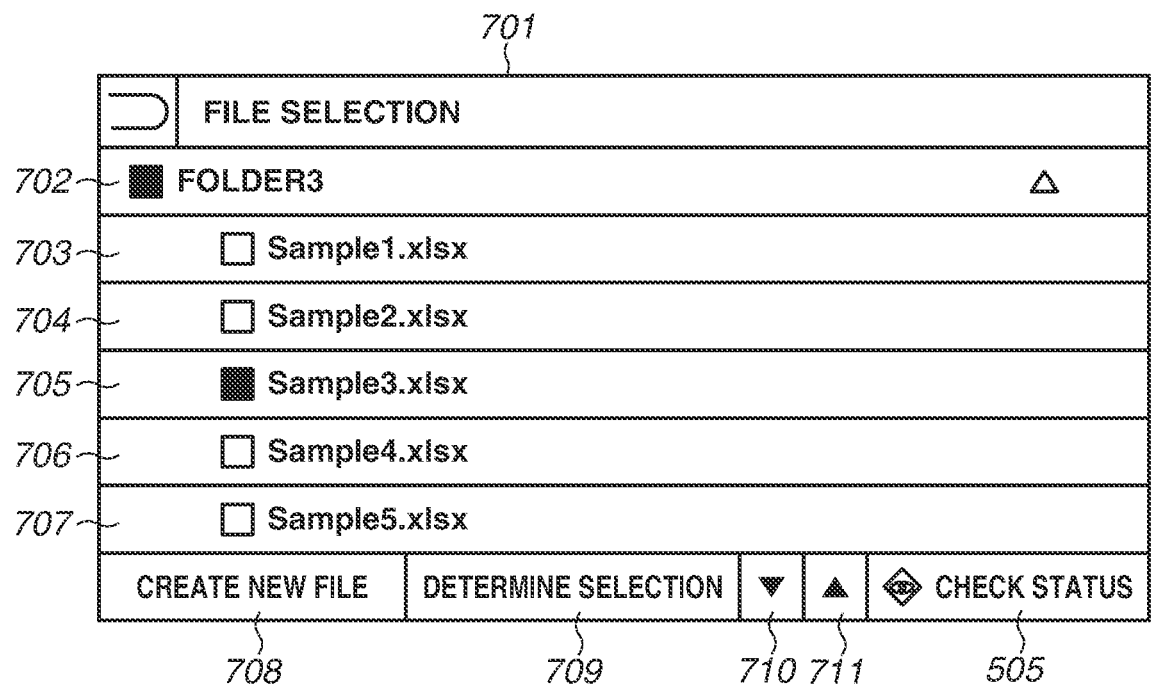
FIG. 7 illustrates an example of a file selection screen.

FIG. 7 illustrates an example of a file selection screen 701. The file selection screen 701 is a screen to be displayed on the operation unit 116 after a folder is selected on the folder selection screen 601. If the FOLDER 3 button 604 is selected, the display is changed to the display including a button 702, and buttons 703 to 707 for the respective files stored in the FOLDER 3 are further displayed.

A file to be selected is designated by selecting one button of the buttons 703 to 707 for the files, or pressing a selection button 710 or 711, and a target file is determined by pressing a selection determination button 709. FIG. 7 illustrates an example in which "Sample3.xlsx" is selected as a target file. By pressing a new file creation button 708, a new file can also be created in the FOLDER 3. Then, the created file can be selected as a target file.

In the exemplary embodiment to be described below with reference to FIG. 7 and subsequent drawings, the description will be given of an example in which a file in a Microsoft Excel format is designated, but a file to be read is not limited to such files. For example, a file in a Microsoft Word ° format or a file in a Microsoft PowerPoint® format is readable. Furthermore, a file in a comma separated value (CSV) format is readable.

Figure 8:
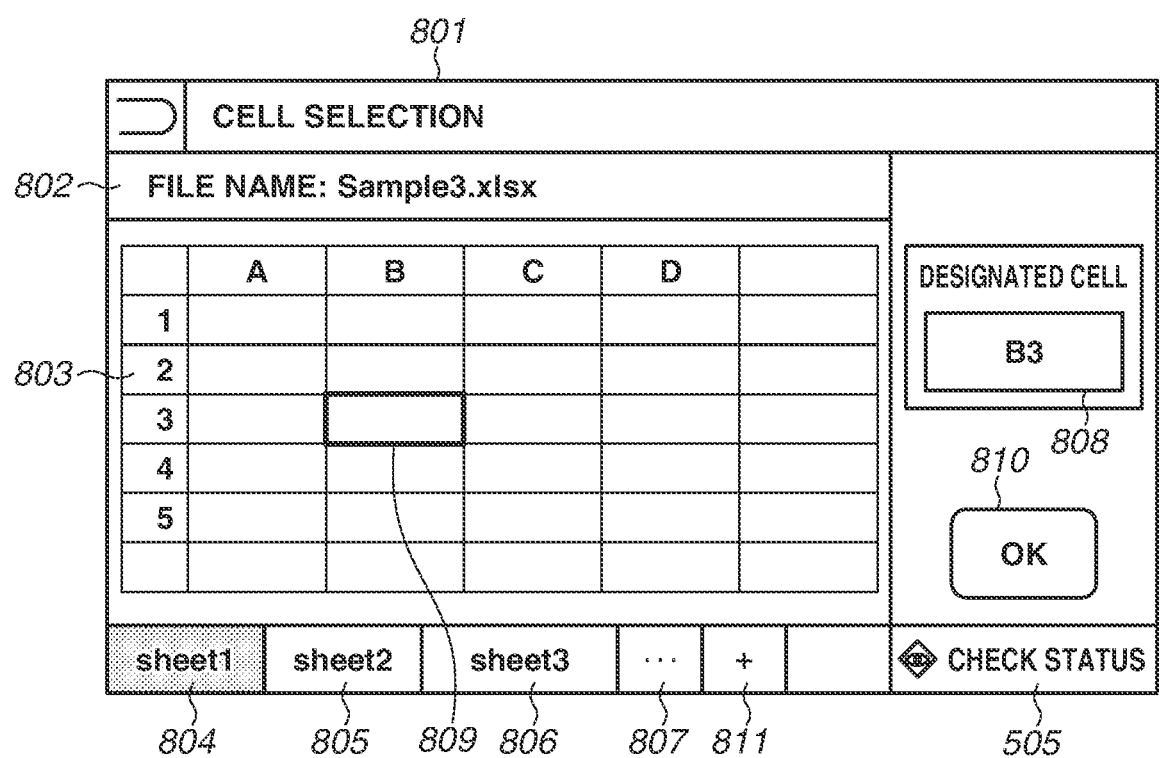
FIG. 8 illustrates an example of a cell selection screen.

FIG. 8 illustrates an example of a cell selection screen 801. On the cell selection screen 801, a preview of a file selected on the file selection screen 701 is displayed on the operation unit 116, and the designation of a cell (position) into which character information is to be inserted is receivable.

A region 802 is a region for displaying a file name of a file selected on the file selection screen 701. Sheet buttons 804 to 806 are buttons for selecting a target sheet from among a plurality of sheets included in the selected file, and the names of the sheets are described in the respective buttons. A preview result 803 indicates a preview result of a sheet selected with one of the sheet buttons 804 to 806. A sheet list display button 807 is a button for displaying a sheet list popup (not illustrated). Pressing the sheet list display button 807 makes a sheet not displayed on the sheet buttons 804 to 806 selectable.

A region 808 is a region for designating a cell into which character information acquired by character recognition processing is to be inserted. Entering the number (identification information) of a cell into this region makes a character recognition result insertable into the cell. The number of cells that can be designated in the region 808 may be one as illustrated in FIG. 8, a plurality of cells, or a range from a predetermined cell to another cell. If no cell is designated on the cell selection screen 801, character information is inserted into a predetermined cell (e.g., A1 cell). The predetermined cell may be identified by the CPU 111 while avoiding a cell into which character information is entered. In other words, if a cell for inserting character information is not designated by the user, the CPU 111 selects a cell into which no character information is entered, from among cells of an insertion target file. Then, a character recognition result is inserted into the selected cell.

If a cell is designated in the region 808, a cursor 809 indicating that the cell is selected is highlighted in the preview result 803. If an OK button 810 is pressed with a sheet and a cell selected, the target file, the target sheet, and the target cell are determined, and information indicating the target file, the target sheet, and the target cell is stored into the RAM 113. In the present exemplary embodiment, the OK button 810 is pressed with a Sheet 1 and a B3 cell selected, and the Sheet 1 is determined to be an insertion target page of a character recognition result. If a sheet addition button 811 is pressed, a new sheet is created, and the new sheet is determined to be an insertion target sheet.

The cell designation is not limited to the entry into the region 808, and the cell designation may be performed by selecting a cell displayed in the preview result 803.

As FIG. 8 illustrates an example in which a spread sheet file is selected, a configuration of designating a sheet of a concept similar to a page is employed. A configuration in which a file in another format is selectable on the file selection screen 701 can be employed. If a file in another format is selected, a page can be designated using a page button in place of a sheet button.

A spread sheet file is used in a spreadsheet application, and includes a plurality of cells (matrix) arranged in rows and columns. In the present exemplary embodiment, a file into which character information is inserted is not limited to a spread sheet file, and character information may be made insertable into a text file, a Portable Document Format (PDF) file, or a Word file.

FIG. 9 illustrates examples of a scan screen 901 and a scan setting screen 911. When an insertion target sheet and an insertion target cell are determined on the cell selection screen 801, the scan screen 901 is displayed on the operation unit 116. In other words, when a sheet and a cell are designated and the OK button 810 is selected, the scan screen 901 is displayed. In a region 902, the file name of a file selected on the file selection screen 701 is displayed. In a region 903, the number of a cell designated on the cell selection screen 801 is displayed. A scan setting button 905 is used for displaying the scan setting screen 911. By pressing the scan setting button 905, the scan setting screen 911 is displayed.

A return button 906 is used for transitioning to the previous screen. By pressing the return button 906, the scan screen 901 transitions to the cell selection screen 801. By pressing a monochrome scan start button 907 or a color scan start button 908 after making scan settings, an original is scanned and image data is generated. The reading unit 118 includes a placement portion on which a plurality of originals can be placed. If the monochrome scan start button 907 or the color scan start button 908 is pressed with a plurality of originals placed on the placement portion, the plurality of originals is continuously scanned and a plurality of pieces of image data are generated.

By pressing the scan setting button 905, the scan setting screen 911 is displayed on the operation unit 116. The regions 902 and 903 and the buttons 907 and 908 on the scan setting screen 911 have functions equivalent to the corresponding regions and buttons on the scan screen 901, the description will be omitted. In a region 912, information indicating a reading setting screen is displayed. If a reading size button 913 is selected, a screen for setting a scan size is displayed. If a resolution button 914 is selected, a screen for setting a scan resolution is displayed. Moreover, a reading mode button 915 and a white background removal setting button 916 are displayed. In the above-described settings, setting items may be automatically adjusted by automatically recognizing the type of an original. A return button 917 is used for transitioning to the previous screen. If the return button 917 is selected, the scan setting screen 911 transitions to the scan screen 901.

Figure 10:
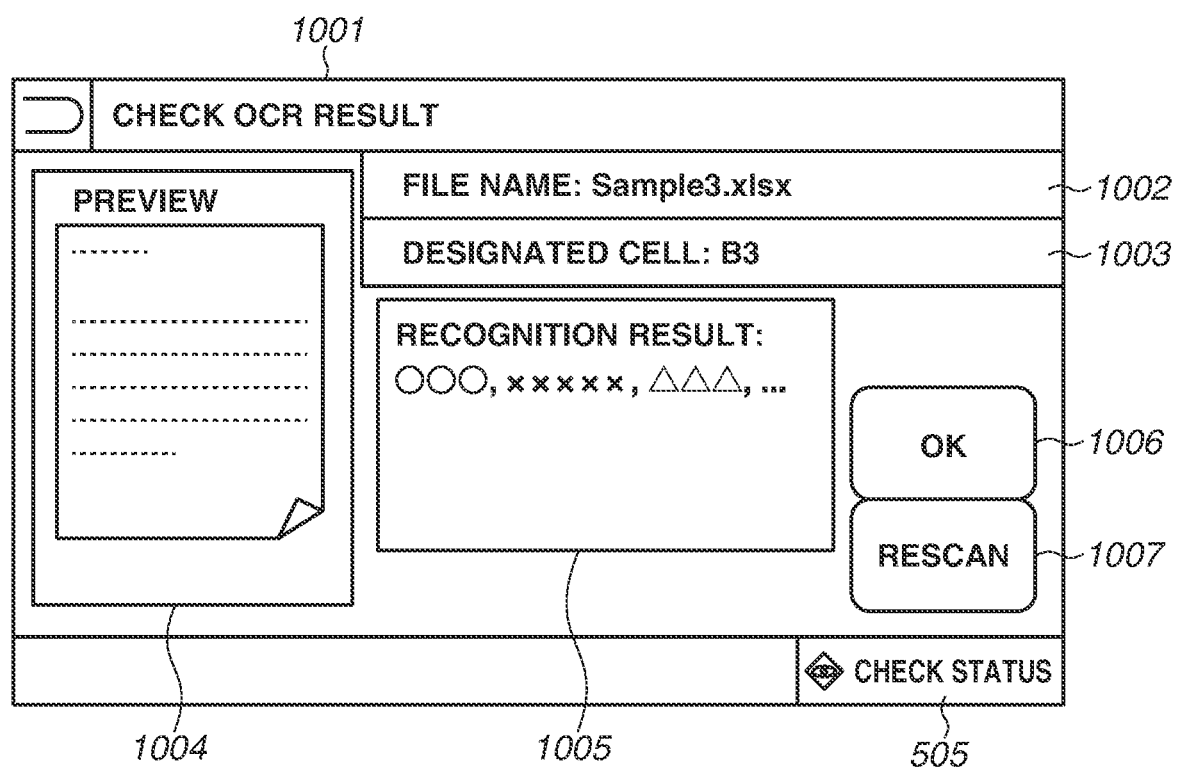
FIG. 10 illustrates an example of a recognition result screen.

FIG. 10 illustrates an example of a recognition result screen 1001. On the completion of scan processing started by the monochrome scan start button 907 or the color scan start button 908 being pressed on the scan screen 901, the recognition result screen 1001 is displayed on the operation unit 116.

In a region 1002, the file name of a file selected on the file selection screen 701 is displayed. In a region 1003, the number of a cell designated in the region 808 is displayed.

A preview region 1004 is used for displaying a preview of an image generated by scanning an original. A preview image of image data generated by the monochrome scan start button 907 or the color scan start button 908 being selected and an original being scanned is displayed.

A recognition result preview region 1005 is used for displaying a preview of a character recognition result, and character information as a result of character recognition processing is displayed.

An OK button 1006 is pressed when preview check is completed. By the OK button 1006 being pressed, the processing of inserting character information into a file is performed. A rescan button 1007 is pressed if a result of character recognition processing includes an error, or rescan is performed because a scanned original is the wrong original. When the rescan button 1007 is pressed, image data and a character recognition result stored in the RAM 113 are discarded, and the recognition result screen 1001 transitions to the scan screen 901.

Figure 11:
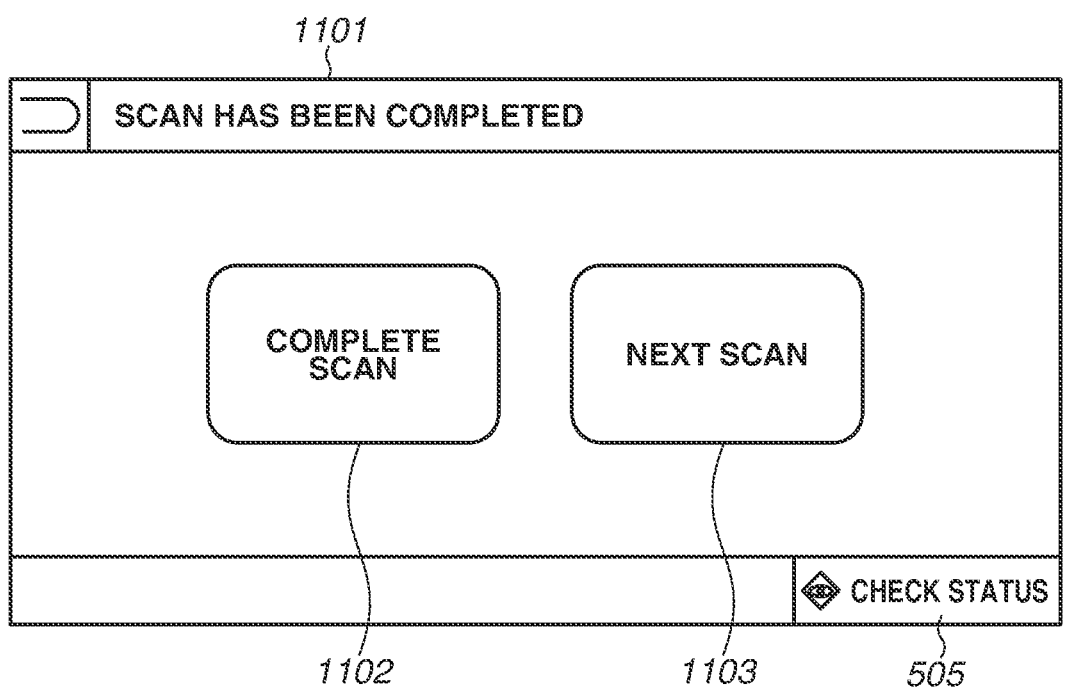
FIG. 11 illustrates an example of a completion screen.

FIG. 11 illustrates an example of a completion screen 1101. On the completion of character information insertion processing started by the OK button 1006 being pressed on the recognition result screen 1001, the completion screen 1101 is displayed on the operation unit 116. If a completion button 1102 is pressed, the completion screen 1101 transitions to the home screen 508. If a next scan button 1103 is pressed, the completion screen 1101 transitions to the cell selection screen 801. At this time, the same file as a target file in the previous scan is selected as an insertion target file.

Figure 12:
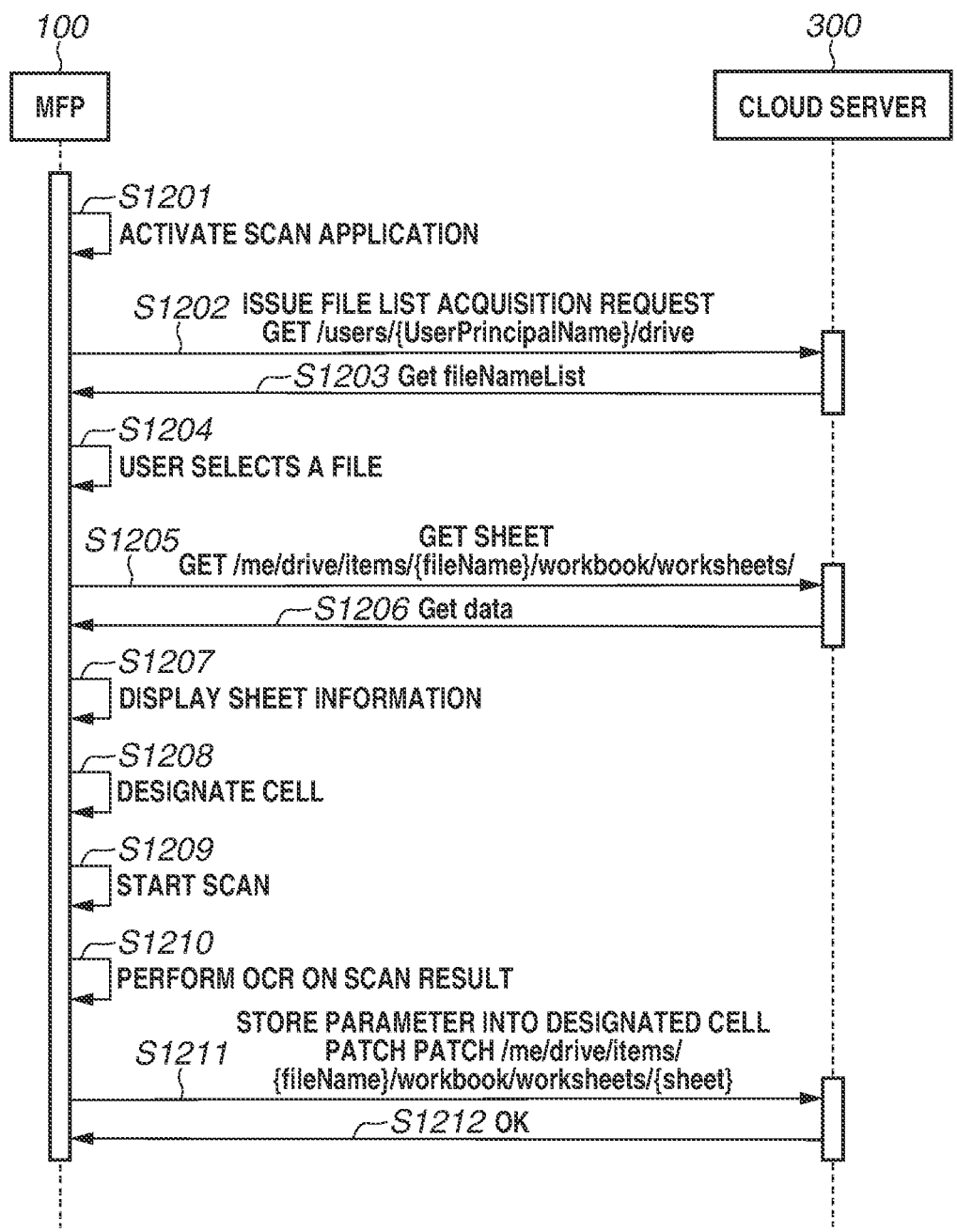
FIG. 12 illustrates a sequence as an example of processing of inserting a character recognition result into a selected file.

FIG. 12 is a sequence illustrating an example of processing of inserting a character recognition result into a selected file.

This sequence is started by the home screen 508 being displayed. In step S1201, the CPU 111 of the MFP 100 activates a dedicated scan application based on the selection of the button 512.

In step S1202, the CPU 111 of the MFP 100 issues a request for acquiring a file name list stored in a folder selected on the folder selection screen 601 by the user, by controlling the communication unit 126 and performing HTTP communication with the cloud server 300. Specifically, the CPU 111 of the MFP 100 transmits to the cloud server 300 information indicating a request for user information and a URL or folder path information that are entered by the user on the MFP 100, and the file name of a file stored in the folder path. In this example, by transmitting user information UserPrincipalName entered on the MFP 100 to the cloud server 300 with user information UserPrincipalName included in HTTP communication, information on the user information in the folder path is identified. An example of a command to be transmitted here is "HTTP GET /users/{UserPrincipalName}/drive". By transmitting the user information using the URL, the cloud server 300 searches for the file corresponding to the folder path information appropriate for a user.

In step S1203, the CPU 301 of the cloud server 300 generates a file name list included in the folder that is based on the user information received in S1202. The file name list is sequence information indicating names of files included in a specific folder path. The file name list includes the name of a file and attribute information on the file. Then, the CPU 301 of the cloud server 300 notifies the MFP 100 of the generated file name list as response information to the HTTP communication.

In step S1204, the CPU 111 of the MFP 100 displays the file selection screen 701 on the touch panel 501 of the operation unit 116 based on file names included in the received file name list information, and receives file selection made by the user.

In step S1205, the CPU 111 of the MFP 100 issues a request for acquiring the content of the file selected in step S1204, by controlling the communication unit 126 and performing HTTP communication with the cloud server 300. An example of a command to be transmitted here is "HTTP GET /me/drive/items/{fileName}/workbook/worksheets/". By adding file information {fileName} to the URL, the cloud server 300 searches for the file content corresponding to the selected file.

In step S1206, the CPU 301 of the cloud server 300 checks whether the access to the URL is permitted, based on the file information received in step S1205. If the access is permitted, the CPU 301 of the cloud server 300 performs processing of searching for the file corresponding to the file information, and accessing the file content. Specifically, the CPU 301 of the cloud server 300 reads out and loads the content of the file data into a file data buffer provided in the RAM 303, to prepare transmission of the file content. Then, the CPU 301 of the cloud server 300 transmits the read-out file data to the MFP 100 as response information to the HTTP communication. In the present exemplary embodiment, a configuration of acquiring all pieces of sheet information included in a selected file is employed, but a configuration of acquiring a part of sheets of a selected file may be employed. For example, with a configuration of acquiring a foremost sheet alone, the processing in steps S1205 and S1206 is performed each time another sheet is selected using one of the sheet buttons 805 to 807, and 811, and an acquisition result is reflected in the preview result 803.

In step S1207, the CPU 111 of the MFP 100 displays the cell selection screen 801 on the touch panel 501 of the operation unit 116, and displays the sheet information received in step S1206 in the preview result 803.

In step S1208, the operation unit 116 of the MFP 100 receives the designation of a cell in the region 808 from the user via the touch panel 501. After that, by the OK button 810 being selected, a target cell is determined, and identification information on the designated insertion target cell is stored into the RAM 113.

In step S1209, the operation unit 116 of the MFP 100 receives the selection of the monochrome scan start button 907 or the color scan start button 908 from the user via the touch panel 501, and issues a scan start instruction to the MFP 100. Then, the CPU 111 generates image data by scanning an image on an original by controlling the reading unit 118. At the time, image data is generated based on scan settings made on the scan setting screen 911.

In step S1210, the CPU 111 of the MFP 100 performs character recognition processing on the image data generated in step S1209. The character recognition processing may be performed on the entire image data, or may be performed on a region designated by the user. The region designation may be preset on the scan setting screen 911, or may be made settable after an original is scanned. Then, the setting may be received via the operation unit 116, or may be received from an external apparatus communicating with the MFP 100. In the present exemplary embodiment, an example of acquiring character information by character recognition processing (optical character recognition (OCR)) will be described, but an acquisition method is not limited to this. For example, character information may be acquired by decoding a code (barcode or a quick response (QR) code®) included in image data. Also in this case, the code may be searched for in the entire image data, or character information may be acquired from a code included in a region designated by the user.

Furthermore, the CPU 111 of the MFP 100 displays the recognition result screen 1001 on the touch panel 501 of the operation unit 116. Then, the CPU 111 of the MFP 100 prompts the user to check a character recognition result, and receives the selection of the OK button 1006.

In step S1211, the CPU 111 of the MFP 100 transmits the character recognition result and the cell identification information stored in step S1208 to the cloud server 300. An example of a command to be transmitted here is "HTTP PATCH me/drive/items/{fileName}/workbook/worksheets/{sheet}/". File information {fileName} on the file selected in step S1204, and sheet information {sheet} on the sheet selected on the cell selection screen 801 are added to the URL. In addition, identification information (position information) on the target cell and character information as the character recognition result are also included as body information.

In step S1212, the CPU 301 of the cloud server 300 inserts the character information indicating the character recognition result into the designated cell on the designated sheet of the designated file on the cloud server 300 based on the information received in step S1211. Then, the CPU 301 of the cloud server 300 overwrites and saves the file. Then, the CPU 301 of the cloud server 300 transmits the result of update processing to the MFP 100 as response information to the HTTP communication. When receiving information indicating a success in update, the CPU 111 of the MFP 100 displays the completion screen 1101 on the touch panel 501 of the operation unit 116.

Such a configuration allows insertion of character information acquired from image data generated by selecting and scanning an already-existing file.

In this configuration, the CPU 111 of the MFP 100 performs character recognition processing and cell designation reception, and the CPU 301 of the cloud server 300 actually performs character information insertion.

As another configuration, the CPU 111 of the MFP 100 may perform character recognition processing and the CPU 111 of the MFP 100 may actually perform processing up to insertion processing of a character recognition result, and transmit an updated file to the cloud server 300. Character recognition processing may be performed by a character recognition server (not illustrated). In this case, the MFP 100 transmits image data generated by scanning to the character recognition server, and the character recognition server performs character recognition processing on the image data. Then, the character recognition server transmits character information indicating a character recognition result of the image data to the MFP 100, and the MFP 100 transmits the character information to the cloud server 300. The character recognition server may also directly transmit character information indicating a character recognition result to the cloud server 300.

A file to be selected on the file selection screen 701 may be a file stored in an external apparatus, such as the cloud server 300, or a file stored in the storage 114 of the MFP 100. In this case, a file in which character information is inserted is merely updated in the storage 114 without being transmitted.

Figure 13:
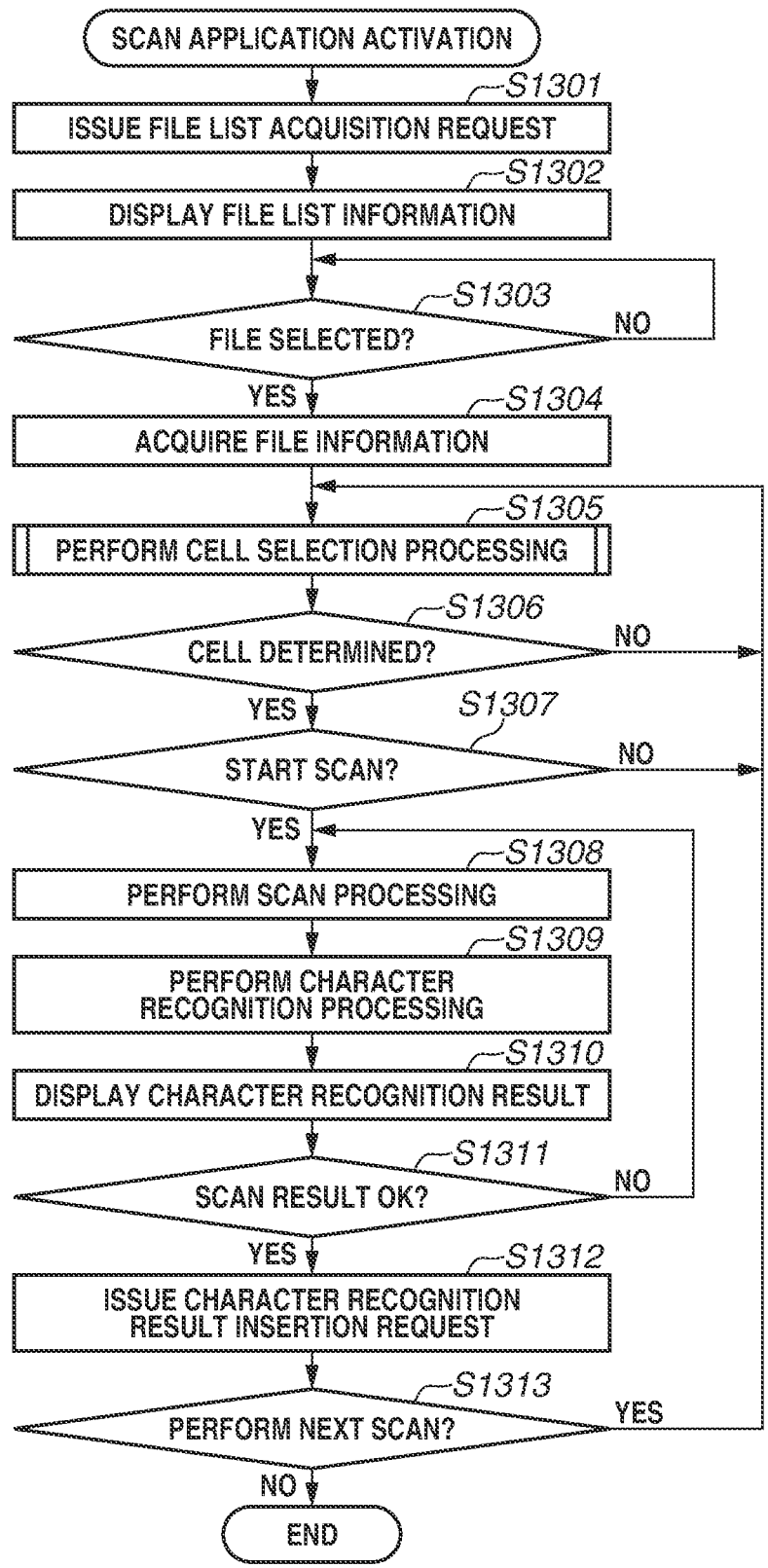
FIG. 13 is a flowchart illustrating an example of the processing of inserting a character recognition result into a selected file.

FIG. 13 is a flowchart illustrating an example of processing of inserting a character recognition result into a selected file.

In the processing, the MFP 100 performs character recognition processing on an image on a scanned original, and stores a character recognition result into a file selected on the cloud server 300. This procedure is started by the selection of the button 512 being received on the home screen 508 illustrated in FIG. 5, and a scan application being activated. Then, the processing of this procedure is performed by the CPU 111 loading a program stored in the storage 114 onto the RAM 113.

In step S1301, the CPU 111 of the MFP 100 issues a file list acquisition request to the cloud server 300. After a file list is received, the processing proceeds to step S1302.

In step S1302, the CPU 111 of the MFP 100 displays the file list received in step S1301 on the touch panel 501 of the operation unit 116.

In step S1303, the CPU 111 of the MFP 100 waits for the selection determination button 709 to be pressed. After the user selects a file on the file selection screen 701, the user presses the selection determination button 709. If the selection determination button 709 is pressed (YES in step S1303), the processing proceeds to step S1304.

In step S1304, the CPU 111 of the MFP 100 issues a request for acquiring file information on the file selected in step S1303 to the cloud server 300. After the file information is acquired, the processing proceeds to step S1305.

In step S1305, the CPU 111 of the MFP 100 performs cell selection processing. The details of the processing will be described with reference to FIG. 14.

In step S1306, the CPU 111 of the MFP 100 detects whether the OK button 810 is pressed. If the OK button 810 is pressed (YES in step S1306), the processing proceeds to step S1307. If the OK button 810 is not pressed (NO in step S1306), the processing returns to the processing in step S1305.

In step S1307, the CPU 111 of the MFP 100 waits for the monochrome scan start button 907 or the color scan start button 908 to be pressed. If the monochrome scan start button 907 or the color scan start button 908 is pressed (YES in step S1307), the processing proceeds to step S1308. If the return button 906 is pressed (NO in step S1307), the processing returns to the processing in step S1305.

In step S1308, the CPU 111 of the MFP 100 scans an image on an original by controlling the reading unit 118, and generates image data.

In step S1309, the CPU 111 of the MFP 100 performs character recognition processing on the generated image data.

In step S1310, the CPU 111 of the MFP 100 displays a character recognition result output by the character recognition processing in the recognition result preview region 1005.

In step S1311, the CPU 111 of the MFP 100 waits for the OK button 1006 to be pressed. If the press of the OK button 1006 is detected (YES in step S1311), the processing proceeds to step S1312. If the press of the rescan button 1007 is detected (NO in step S1311), the image data and the character recognition result are discarded, and the processing returns to the processing in step S1308.

In step S1312, the CPU 111 of the MFP 100 issues a request to store the character recognition result into the position designated in step S1305, to the cloud server 300. If the CPU 301 of the cloud server 300 receives the request, the CPU 301 of the cloud server 300 performs character recognition result insertion processing illustrated in FIG. 17, on the file selected in step S1303. After a response is received from the cloud server 300, the processing proceeds to step S1313.

In step S1313, the CPU 111 of the MFP 100 displays the completion screen 1101 on the operation unit 116. If the completion button 1102 is pressed (NO in step S1313), the processing ends and the application ends. If the next scan button 1103 is pressed (YES in step S1313), the processing returns to the processing in step S1305.

By performing the processing in step S1313, a plurality of pieces of character information acquired from image data generated by scanning a plurality of originals can be inserted into one selected file. For example, the CPU 111 acquires first character information from first image data generated by scanning a first original (first page), and acquires second character information from second image data generated by scanning a second original (second page). Then, the CPU 111 performs processing for inserting the acquired character information into one file selected in step S1303.

In step S1303, the selection of a plurality of files may be received, and processing for inserting character information on each piece of generated image data in a file may be performed or processing for inserting each piece of character information into a file may be performed.

Figure 14:
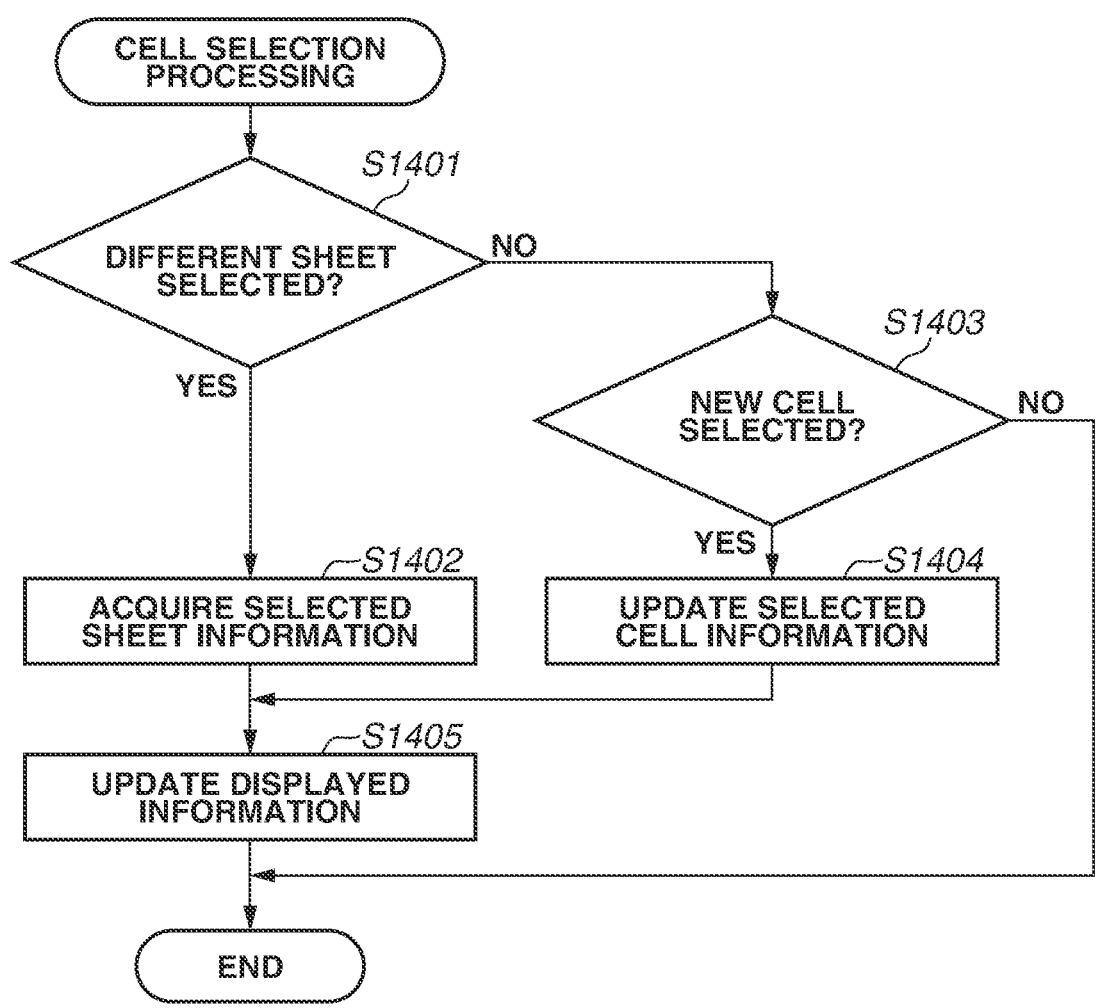
FIG. 14 is a flowchart illustrating an example of cell selection processing.

FIG. 14 is a flowchart illustrating an example of cell selection processing. The procedure illustrated in FIG. 14 is started on the completion of the processing in step S1304.

In step S1401, the CPU 111 of the MFP 100 determines whether a sheet different from a sheet selected so far is selected by the user. By pressing one of the sheet buttons 804 to 806 or the sheet list display button 807, the user can select the different sheet. If the different sheet is selected (YES in step S1401), the processing proceeds to step S1402. If the same sheet is selected (NO in step S1401), the processing proceeds to step S1403.

In step S1402, the CPU 111 of the MFP 100 acquires information on the selected sheet.

In step S1403, the CPU 111 of the MFP 100 receives the selection of a cell in the region 808. Then, the CPU 111 of the MFP 100 determines whether a cell selected in the region 808 so far is changed. If the cell is changed (YES in step S1403), the processing proceeds to step S1404. If the cell is not changed (NO in step S1403), the processing ends.

In step S1404, the CPU 111 of the MFP 100 updates information on the cell referred to in the sheet.

In step S1405, the CPU 111 of the MFP 100 updates a preview result displayed in the preview result 803, using information on the selected sheet and information on the cell.

Figure 17:
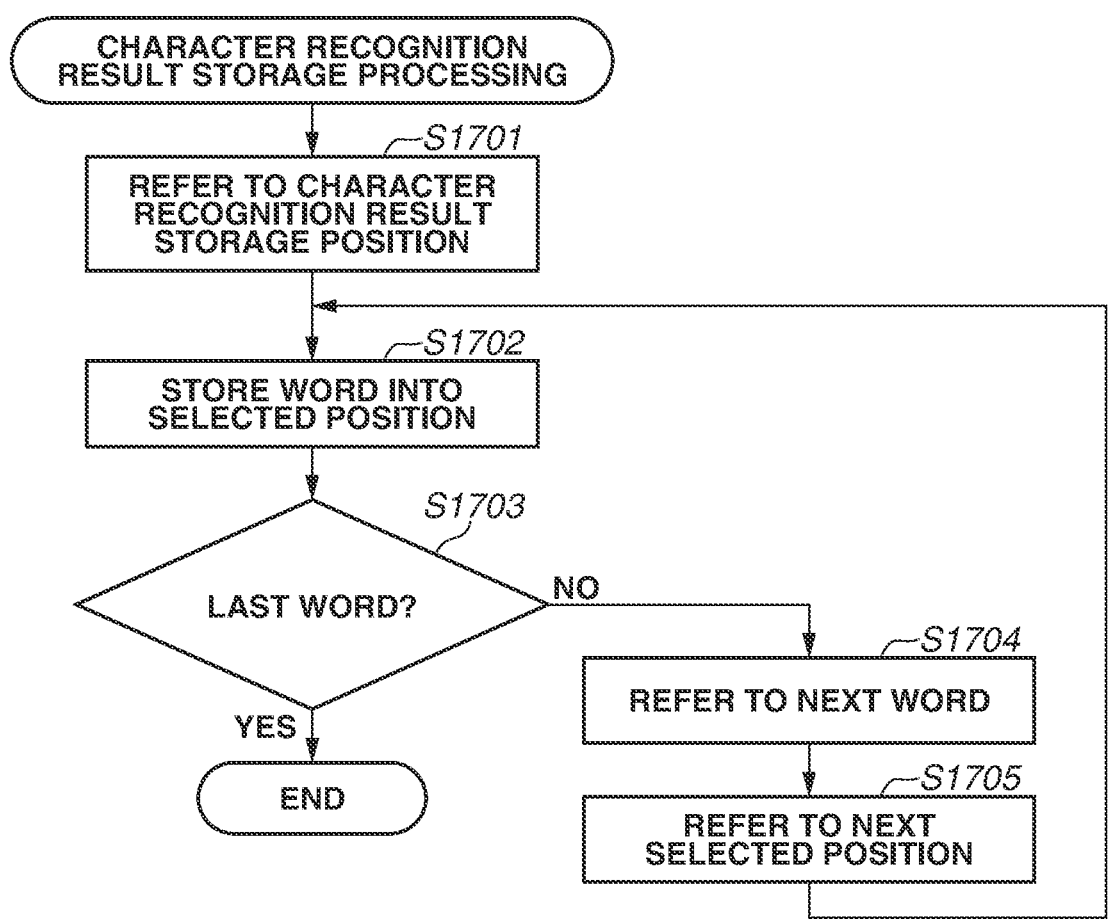
FIG. 17 is a flowchart illustrating an example of recognition result insertion processing.

FIG. 17 is a flowchart illustrating an example of recognition result insertion processing. The processing in the procedure illustrated in FIG. 17 is performed by the CPU 301 of the cloud server 300 loading a program stored in the HDD 305 onto the RAM 303. The procedure illustrated in FIG. 17 is started by the cloud server 300 receiving a character recognition result insertion request from the MFP 100.

In step S1701, the CPU 301 of the cloud server 300 acquires information indicating the cell selected in step S1305 of the file selected in step S1303, from the MFP 100, and stores information on the selected file and information on the selected cell into the RAM 303. Furthermore, the CPU 301 of the cloud server 300 also receives a character recognition result from the MFP 100, and stores the character recognition result into the RAM 303. The CPU 301 of the cloud server 300 also acquires a beginning word from the received character recognition result, and stores the acquired word as a current word.

In step S1702, the CPU 301 of the cloud server 300 inserts the current word into the target cell on the target sheet of the target file identified based on the information received in step S1701 (information on the file, information on the sheet, information on the cell).

In step S1703, the CPU 301 of the cloud server 300 determines whether the current word is the last word of the character recognition result. If the current word is the last word (YES in step S1703), the processing ends.

If the next word exists (NO in step S1703), the processing proceeds to step S1704.

In step S1704, the CPU 301 of the cloud server 300 stores the next word as a current word.

In step S1705, the CPU 301 of the cloud server 300 shifts the target cell to a different cell. At the time, which cell to be selected as the target is determined based on a rule preset on the cell selection screen 801. For example, if a rule is set in such a manner that inserts words in accordance with a line break of an original, a target cell is shifted rightward until the last word of the initial row of the original is inserted, and the next word is inserted into a cell under the initial word. As another example, words can be always inserted downward; regardless of the arrangement of words in an original, words are inserted while a target cell is always shifted downward.

Figure 18:
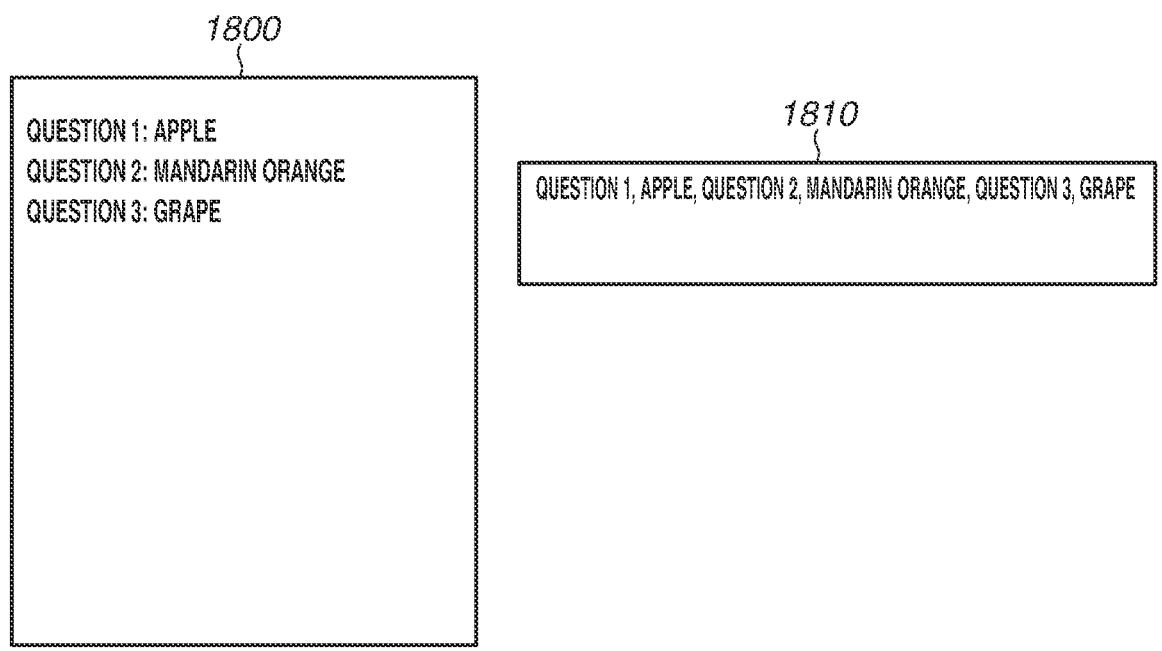
FIG. 18 illustrates an insertion example of a character recognition result.

FIG. 18 illustrates an insertion example of a character recognition result. In an original 1800, character strings are described in a plurality of rows. By the original 1800 being scanned in the processing in step S1308, and character recognition processing being performed in the processing in step S1309, character information 1810 is acquired. In this example, the character recognition processing is performed on the entire original, and character search/extraction is performed from the top left to the right of the original, and after character search/extraction in one row ends, character search/extraction in the next row is performed. Thus, character information is acquired in the order indicated in character information 1810.

With the words up to "Question 2" in the character information 1810 inserted, the inserted characters are arranged as in an insertion example 1820. The insertion example 1820 is an example the "A1" cell as the designated cell, and the characters are inserted while the target cell is shifted downward in order from the "A1" cell. When the words up to "Question 2" are inserted, the next target cell becomes the "A4" cell, and "mandarin orange" is inserted into a target cell 1821.

In the above-described processing, character information indicating a character recognition result is inserted into a selected file. In addition to the character information, image data generated by scanning may also be inserted into the selected file. In this case, the CPU 111 may automatically transmit an instruction to insert character information into a sheet different from the selected sheet, as an insertion position of the character information.

The above-described configuration allows a user to save the trouble in adding character information included in image data generated by an image processing apparatus reading an image on an original, to an existing file.

A second exemplary embodiment will be described. In the present exemplary embodiment, processing of inserting a character recognition result into a file stored in the file server 400 to which the MFP 100 can connect via SMB communication or the like will be described.

Figure 15:
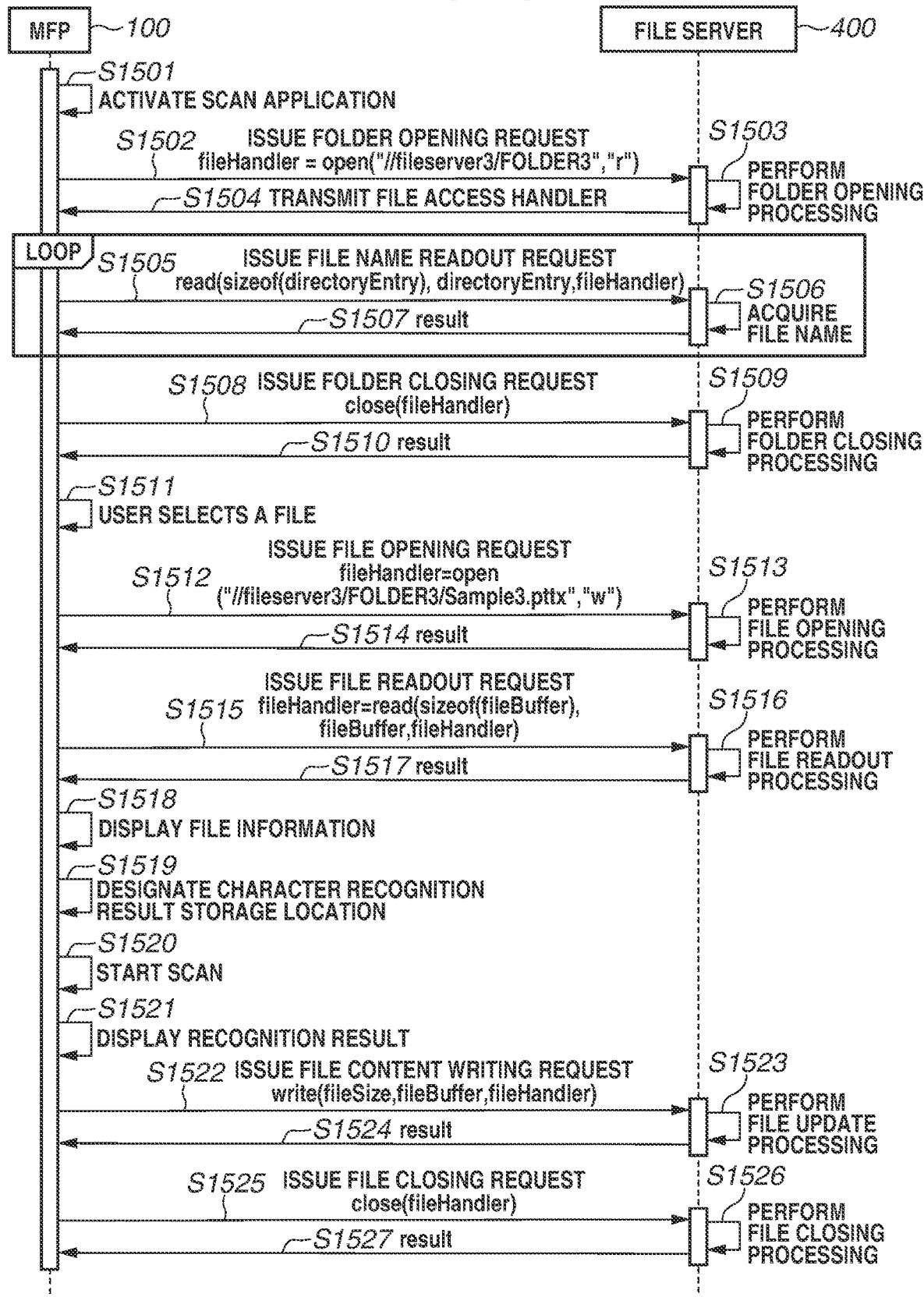
FIG. 15 illustrates a sequence as an example of the processing of inserting a character recognition result into a selected file.

FIG. 15 is a sequence illustrating an example of processing of inserting a character recognition result into a selected file. Communication for using a file server is typically performed using the SMB or a network file system (NFS). In the above-described communication, to keep handling compatibility with local files, processing similar to a function of a general file system is performed. In the description of the present exemplary embodiment, similar processing is performed also in a function generally called "BOX" provided in the storage 114 in the MFP 100. In the present exemplary embodiment, the description will be given in the format of a function of a general file system and a directory entry included in a folder. This sequence is started by the home screen 508 being displayed.

In step S1501, the CPU 111 of the MFP 100 detects a press of a button triggering the character recognition result insertion processing. In other words, the CPU 111 of the MFP 100 detects a press of the button 512 on the home screen 508 illustrated in FIG. 5.

In step S1502, the CPU 111 of the MFP 100 issues a request for acquiring the file name of a file stored in a designated folder, by controlling the communication unit 126 and performing communication with the file server 400. Specifically, the CPU 111 of the MFP 100 issues a request for opening the directory of a designated folder by controlling the communication unit 126 and performing communication with the file server 400.

An example of a command to be transmitted is "open("// fileserver3/FOLDER3","r")". The CPU 111 of the MFP 100 performs processing for opening a "/FOLDER3" folder of a file server "fileserver3", and issues a request for acquiring a file name included in a directory entry.

In step S1503, the CPU 401 of the file server 400 checks whether the access to the designated folder path is permitted, based on user information and folder path information that are received from the MFP 100 via the communication unit 404. If the access is permitted, the file system generates a file access table (not illustrated) for performing processing for opening the folder corresponding to the folder path information, and accessing the folder, in the RAM 403. The file access table includes access position information for performing file readout and writing, open mode information indicating whether a file is opened for read only or opened for read/write, and file attribute information. The file access table is information for internal file system module processing, and direct reference from the outside of the file system is prohibited for operation guarantee and independence of file processing. To designate a processing target file and a processing target folder from the outside of the file system, a file access handler is returned as a return value as file reference information corresponding to the generated file access table in each piece of open processing. The returned file access handler can be designated using a file system function of readout or writing. The file access handler is valid until processing in which the file access handler is designated is performed in closing processing, and after the closing processing, the file access handler becomes invalid.

In step S1504, the CPU 401 of the file server 400 controls the communication unit 404, and transmits the file access handler to the folder path generated in the MFP 100 in step S1503, as response information to the communication.

In step S1505, the CPU 111 of the MFP 100 issues a request for acquiring directory entry information included in the folder path, to the file server 400 using the received file access handler. The directory entry information is packaged information including file attributes such as a file name and a file generation time. An example of a command to be transmitted is "read(sizeof(directoryEntry),directoryEntry, fileHandler)".

In step S1506, the CPU 401 of the file server 400 generates a file name by generating directory entry information based on the file access handler received from the MFP 100 via the communication unit 404.

In step S1507, the CPU 401 of the file server 400 controls the communication unit 404, and transmits the directory entry generated in step S1506 to the MFP 100 as response information to the communication.

The sequence in steps S1505, S1506, and S1507 is repeated the number of times equivalent to the number of file names.

In step S1508, the CPU 111 of the MFP 100 issues a request for ending the processing on the folder path to the file server 400 using the received file access handler. An example of a command to be transmitted is "close(fileHandler)".

In step S1509, the CPU 401 of the file server 400 ends the access to the file path designated using the file access handler based on the file access handler received from the MFP 100 via the communication unit 404.

In step S1510, the CPU 401 of the file server 400 controls the communication unit 404, and transmits a result of the folder closing processing in step S1509 to the MFP 100 as response information to the communication.

In step S1511, the CPU 111 of the MFP 100 displays the file selection screen 701 on the touch panel 501 of the operation unit 116 based on a file name included in the received directory entry information, and waits for a user operation to be performed on the selection determination button 709. In the present exemplary embodiment, the description will be given of a case where "Sample3.xlsx" is selected as a target file with the selection determination button 709.

In step S1512, the CPU 111 of the MFP 100 issues a request for opening the file determined in step S1511, by controlling the communication unit 126 and performing communication with the file server 400. An example of a command to be transmitted here is "open("//fileserver3/FOLDER3/Sample3.pttx", "w")".

In step S1513, the CPU 401 of the file server 400 checks whether the access to the designated folder path is permitted, based on the command and the information that are received from the MFP 100 via the communication unit 404. If the access is permitted, the opening processing for accessing file content is performed by searching for the file corresponding to the file path information, and a file access handler for accessing file content is generated.

In step S1514, the CPU 401 of the file server 400 controls the communication unit 404, and transmits the file access handler generated in step S1513 to the MFP 100 as response information to the communication.

In step S1515, the CPU 111 of the MFP 100 issues a request for acquiring the content of the file designated by the file path to the file server 400 using the received file access handler. An example of a command to be transmitted is "read(sizeof(fileBuffer),fileBuffer,fileHandler)". In this example, readout for the buffer size is requested.

In step S1516, the CPU 401 of the file server 400 performs processing for transmitting file content based on the file access handler received from the MFP 100 via the communication unit 404. If a designated reading size is larger than an actual file size, readout for the actual file size is performed.

In step S1517, the CPU 401 of the file server 400 controls the communication unit 404, and transmits the file content prepared in step S1516 and a data size in which the readout is performed to the MFP 100 as response information to the communication.

In step S1518, the CPU 111 of the MFP 100 stores the file content received in step S1517 into a received file data buffer provided in the RAM 113. Then, the CPU 111 of the MFP 100 analyzes content in the received file data buffer, performs preview display as in the preview result 803, and waits for a page determination operation to be performed by the user using one of the sheet buttons 804 to 806. In addition, whether the entire file for which the acquisition request is issued is stored into the received file data buffer is determined by comparing the received read data size and the data size of the received file data buffer transmitted at the time of the reading request. In the present exemplary embodiment, the description will be given with the entire file stored in the receive buffer. If it is determined that the entire file cannot be stored into the received file data buffer, the received file content is temporarily stored into the storage 114 as a file. Then, preview display may be performed by reading out and loading data on each page for preview display into a buffer provided in the RAM 113. Also if it is difficult to directly refer to the file content, such as a case where the file content received in step S1517 is compressed, the file content is temporarily stored into the storage 114 as a file. Then, with the compressed file content decompressed, the file content may be further temporarily stored into the storage 114 as a file, and preview display may be performed by reading out and loading data on each page that is necessary for preview display into the buffer provided in the RAM 113.

In step S1519, the user enters cell identification information in the region 808 via the touch panel 501 of the operation unit 116. After that, by pressing the OK button 810, the user determines the position information.

In step S1520, the user presses the monochrome scan start button 907 or the color scan start button 908 via the touch panel 501 of the operation unit 116, and issues a scan start instruction to the MFP 100.

In step S1521, the CPU 111 of the MFP 100 displays the recognition result screen 1001 on the touch panel 501 of the operation unit 116. After checking a character recognition result, the user presses the OK button 1006.

In step S1522, if the CPU 111 of the MFP 100 detects a press of the OK button 1006 in step S1521, the CPU 111 of the MFP 100 transmits a result obtained by storing the character recognition result into the position designated in the region 808, to the file server 400. Specifically, to transmit the updated content of the received file data buffer, the CPU 111 of the MFP 100 calculates the updated file size. An example of the calculated file size will be described as "fileSize". The CPU 111 of the MFP 100 transmits a request to write the file access handler, the file size, the content of the received file data buffer, and transmitted data into a file, to the file server 400. An example of a command to be transmitted here is "write(fileSize,fileBuffer,fileHandler)". By transmitting the command, the file server 400 performs writing into a file corresponding to the transmitted information.

In step S1523, the CPU 401 of the file server 400 updates a file corresponding to the file access handler, based on the file access handler and the character recognition result that are received from the MFP 100 via the communication unit 404.

In step S1524, the CPU 401 of the file server 400 controls the communication unit 404, and transmits a result of the command updated in step S1523, to the MFP 100 as response information to the communication.

In step S1525, the CPU 111 of the MFP 100 issues a request for ending processing on the file path, to the file server 400 using the received file access handler. An example of a command to be transmitted is "close(fileHandler)".

In step S1526, the CPU 401 of the file server 400 ends the access to the file path designated using the file access handler, based on the file access handler received from the MFP 100 via the communication unit 404.

In step S1527, the CPU 401 of the file server 400 controls the communication unit 404, and transmits a result of the closing processing performed in step S1526, to the MFP 100 as response information to the communication. If the closing processing is successful, the CPU 111 of the MFP 100 displays the completion screen 1101 on the touch panel 501 of the operation unit 116. If the closing processing is unsuccessful, the CPU 111 of the MFP 100 may display a notification indicating that the closing processing is unsuccessful, on the operation unit 116. A notification indicating that the update is unsuccessful may be displayed when the closing processing is unsuccessful, without displaying any notification when the closing processing is successful.

Figure 16:
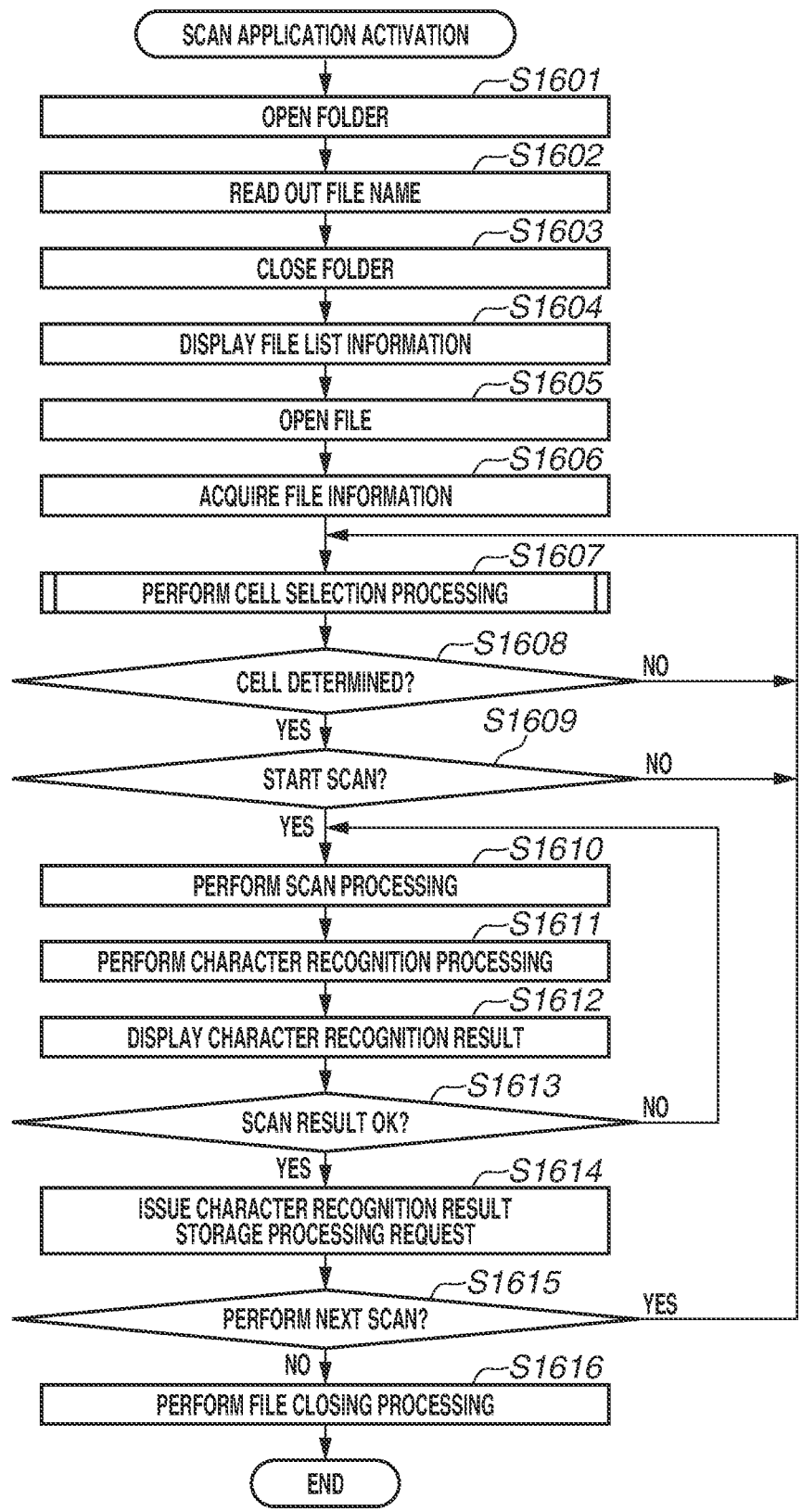
FIG. 16 is a flowchart illustrating an example of the processing of inserting a character recognition result into a selected file.

FIG. 16 is a flowchart illustrating an example of processing of inserting a character recognition result into a selected file. This procedure is started by the button 512 being pressed on the home screen 508 illustrated in FIG. 5 (i.e., the processing in step S1501 being performed).

In step S1601, the CPU 111 displays the folder selection screen 601 on the operation unit 116, and waits for a folder selection determination operation to be performed by the user. Folder information on the selected folder is stored into the RAM 113. The corresponding folder in the file server 400 is opened to acquire a file name in the corresponding folder in the file server 400, a file access handler is acquired, and then, the processing proceeds to step S1602.

In step S1602, the CPU 111 of the MFP 100 acquires a file name list stored in the folder, using the file access handler, by controlling the communication unit 126 and performing communication with the file server 400.

In step S1603, the CPU 111 of the MFP 100 issues a folder closing request corresponding to the file access handler, to the file server 400 by controlling the communication unit 126.

In step S1604, the CPU 111 displays the file selection screen 701 on the operation unit 116 based on the file list received from the file server 400, and waits for a file selection determination operation to be performed by the user. If a file is selected by a press of the selection determination button 709, file information on the selected file is stored into a file information storage region provided in the RAM 113, and the processing proceeds to step S1605. If the new file creation button 708 is pressed in step S1604, information indicating that a new file creation instruction is issued is stored into the file information storage region provided in the RAM 113, and the processing proceeds to step S1605.

In step S1605, the CPU 111 controls the communication unit 126, issues a request for opening file data to the file server 400 using the selected file information stored in the RAM 113, and acquires a file access handler, and the processing proceeds to step S1606.

In step S1606, the CPU 111 controls the communication unit 126, and issues a request for acquiring file data to the file server 400 using the file access handler acquired in step S1605. Then, the received file content is stored into the RAM 113, and the processing proceeds to step S1607.

In step S1607, the CPU 111 of the MFP 100 performs cell selection processing. The details of the processing have been described with reference to FIG. 14.

In step S1608, the CPU 111 of the MFP 100 determines whether the OK button 810 is pressed. If the OK button 810 is pressed (YES in step S1608), the processing proceeds to step S1609. If the OK button 810 is not pressed (NO in step S1608), the processing returns to the processing in step S1607.

In step S1609, the CPU 111 of the MFP 100 waits for the monochrome scan start button 907 or the color scan start button 908 to be pressed. If the monochrome scan start button 907 or the color scan start button 908 is pressed (YES in step S1609), the processing proceeds to step S1610. If the return button 906 is pressed (NO in step S1609), the processing returns to the processing in step S1607.

In step S1610, the CPU 111 of the MFP 100 performs original scan processing.

In step S1611, the CPU 111 of the MFP 100 performs character recognition processing on a scan image obtained by the scan processing.

In step S1612, the CPU 111 of the MFP 100 displays a character recognition result output by the character recognition processing, in the recognition result preview region 1005.

In step S1613, the CPU 111 of the MFP 100 waits for the OK button 1006 to be pressed. If a press of the OK button 1006 is detected (YES in step S1613), the processing proceeds to step S1614. If a press of the rescan button 1007 is detected (NO in step S1613), the scan result image and the character recognition result are discarded, and the processing returns to the processing in step S1610.

In step S1614, the CPU 111 of the MFP 100 controls the communication unit 126, and issues a request to store the character recognition result into the position designated in step S1607 in a folder of the file server 400. If the CPU 401 of the file server 400 receives the request, the CPU 401 of the file server 400 performs the character recognition result insertion processing illustrated in FIG. 17. This processing includes no change except that the server that performs the processing is changed to the file server 400 from the cloud server 300, and the description will be omitted. After a response is received, the processing proceeds to step S1615.

In step S1615, the CPU 111 of the MFP 100 displays the completion screen 1101 on the operation unit 116. If the completion button 1102 is pressed (NO in step S1615), the processing proceeds to step S1616. If the next scan button 1103 is pressed (YES in step S1615), the processing returns to step S1607.

In step S1616, the CPU 111 of the MFP 100 controls the communication unit 126, issues a file closing request corresponding to the file access handler, to the file server 400, and ends the processing.

The above-described configuration allows a character recognition result to be stored into a cell of an existing file stored in the file server 400 that can connect with the MFP 100 via SMB communication.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-102376, filed Jun. 27, 2022, which is hereby incorporated by reference herein in its entirety.

What is claimed is:

1. An image processing apparatus comprising:
 a scanner that scans an image of a document to generate image data; and
 a controller that receives selection of a stored file including a spread sheet from a user,
 wherein the controller receives designation of a cell in the spread sheet of the selected file by the user,
 wherein the controller obtains character information from the image data generated by the scanner, and
 wherein the controller performs processing for inserting the obtained character information into the designated cell in the spread sheet of the selected file, and for inserting the image data into the spread sheet of the selected file.

2. The image processing apparatus according to claim 1, further comprising a communicator that communicates with an information processing apparatus,
 wherein the controller receives selection of the file stored in the information processing apparatus, and
 wherein the processing performed by the controller is processing in which the communicator transmits the obtained character information to the information processing apparatus.

3. The image processing apparatus according to claim 2, wherein the communicator transmits an instruction for inserting the obtained character information, and position information indicating a position of the designated cell.

4. The image processing apparatus according to claim 1, further comprising a display,
 wherein the controller receives designation of the cell in a state that a preview image of the selected file is displayed on the display.

5. The image processing apparatus according to claim 1, wherein the controller receives selection of a sheet included in the spread sheet, and
 wherein the controller performs the processing for inserting the obtained character information into the designated cell in the selected file.

6. The image processing apparatus according to claim 5, wherein the image data generated by the scanner is inserted into another sheet different from the selected sheet in the spread sheet of the selected file.

7. The image processing apparatus according to claim 1, further comprising a storage,
 wherein the controller receives selection of the file stored in the image processing apparatus, and
 wherein the processing performed by the controller is processing in which the storage stores a file in which the character information is inserted, into the spread sheet of the selected file.

8. The image processing apparatus according to claim 1, wherein the controller obtains the character information by performing character recognition processing on the image data.

9. The image processing apparatus according to claim 8, wherein the controller obtains the character information by performing the character recognition processing on an area of the image data, the area being designated by the user.

10. The image processing apparatus according to claim 1, wherein the scanner generates first image data by scanning a first original, the controller obtains first character information from the first image data, the scanner generates second image data by scanning a second original, the controller obtains second character information from the second image data, and the controller performs processing of inserting the first character information the second character information into the spread sheet of the selected file.

11. An image processing system including an image processing apparatus and an information processing apparatus, the image processing system comprising:
 a scanner that scans an image of a document to generate image data; and
 a controller that receives selection of a stored file including a spread sheet from a user,
 wherein the controller receives designation of a cell in the spread sheet of the selected file by the user,
 wherein the controller obtains character information from the image data generated by the scanner, and
 wherein the controller performs processing for inserting the obtained character information into the designated cell in the spread sheet of the selected file, and for inserting the image data into the spread sheet of the selected file.

12. A non-transitory computer-readable storage medium storing a program including instructions for causing an image processing apparatus to perform:
 scanning an image of a document to generate image data;
 receiving selection of a stored file including a spread sheet from a user;
 receiving designation of a cell in the spread sheet of the selected file by the user;
 obtaining character information from the image data generated in the scanning; and
 executing processing for inserting the obtained character information into the designated cell in the spread sheet of the selected file, and for inserting the image data into the spread sheet of the selected file.

* * * * *